(12) United States Patent
Bhowmik

(10) Patent No.: US 9,531,293 B2
(45) Date of Patent: Dec. 27, 2016

(54) SYSTEMS AND METHODS FOR SOLAR PHOTOVOLTAIC ENERGY COLLECTION AND CONVERSION

(75) Inventor: Shibashis Bhowmik, Palo Alto, CA (US)

(73) Assignee: Sinewatts, Inc., Charlotte, NC (US)

(*) Notice: Subject to any disclaimer, the term of this patent is extended or adjusted under 35 U.S.C. 154(b) by 923 days.

(21) Appl. No.: 13/546,868

(22) Filed: Jul. 11, 2012

(65) Prior Publication Data
US 2013/0181527 A1    Jul. 18, 2013

Related U.S. Application Data

(60) Provisional application No. 61/506,544, filed on Jul. 11, 2011.

(51) Int. Cl.
*H02J 3/00*     (2006.01)
*H02M 7/44*    (2006.01)
(Continued)

(52) U.S. Cl.
CPC ............... *H02M 7/44* (2013.01); *H02J 3/383* (2013.01); *H02M 7/49* (2013.01); *H02J 3/40* (2013.01); *H02M 3/1588* (2013.01); *H02M 3/33584* (2013.01); *H02M 3/33592* (2013.01); *Y02B 70/1466* (2013.01); *Y02B 70/1475* (2013.01); *Y02E 10/563* (2013.01); *Y10T 307/609* (2015.04); *Y10T 307/685* (2015.04)

(58) Field of Classification Search
USPC .......................................................... 307/77
See application file for complete search history.

(56) References Cited

U.S. PATENT DOCUMENTS

| 4,719,550 A | 1/1988 | Powell et al. |
| 5,642,275 A | 6/1997 | Peng et al. |
| (Continued) | | |

FOREIGN PATENT DOCUMENTS

| EP | 2 009 778 A1 | 12/2008 |
| JP | 2009290919 A | 10/2009 |
| (Continued) | | |

OTHER PUBLICATIONS

PCT Notification Concerning Transmittal of International Preliminary Report on Patentability for PCT Application No. PCT/US2012/046261, 6 pgs. (Jan. 23. 2014).
(Continued)

*Primary Examiner* — Rexford Barnie
*Assistant Examiner* — Dru Parries
(74) *Attorney, Agent, or Firm* — Blakely, Sokoloff, Taylor & Zafman LLP

(57) ABSTRACT

A circuit for an energy collection system is provided that includes one or more strings that are configured to couple to an electrical load. Each of the one or more strings comprises one or more string members that are coupled to each other in series. Each of the one or more string members comprises (i) a connection to receive an output from an energy output device, and (ii) an inverter configured to convert the output of the energy output device into alternating current (AC) energy. The circuit includes a controller that controls the output that is provided by the one or more strings by controlling the individual string member.

25 Claims, 16 Drawing Sheets

(51) Int. Cl.
*H02J 3/38* (2006.01)
*H02M 7/49* (2007.01)
*H02J 3/40* (2006.01)
*H02M 3/158* (2006.01)
*H02M 3/335* (2006.01)

(56) References Cited

U.S. PATENT DOCUMENTS

| | | | |
|---|---|---|---|
| 6,542,344 | B1 | 4/2003 | Mashiko |
| 7,576,449 | B2 * | 8/2009 | Becker et al. ............... 307/45 |
| 7,643,319 | B2 | 1/2010 | Wagoner |
| 7,796,412 | B2 | 9/2010 | Fornage |
| 7,893,346 | B2 | 2/2011 | Nachamkin et al. |
| 7,962,249 | B1 | 6/2011 | Zhang et al. |
| 8,031,495 | B2 | 10/2011 | Sachdeva et al. |
| 8,089,178 | B2 | 1/2012 | Spanoche et al. |
| 8,089,785 | B2 | 1/2012 | Rodriguez |
| 8,271,599 | B2 | 9/2012 | Eizips et al. |
| 8,482,155 | B2 | 7/2013 | Choi et al. |
| 9,099,938 | B2 | 8/2015 | Ilic et al. |
| 9,143,056 | B2 | 9/2015 | Ilic et al. |
| 2004/0178766 | A1 | 9/2004 | Bucur et al. |
| 2005/0127853 | A1 | 6/2005 | Su |
| 2005/0139259 | A1 | 6/2005 | Steigerwald et al. |
| 2007/0179720 | A1 | 8/2007 | Becker et al. |
| 2008/0078436 | A1 * | 4/2008 | Nachamkin et al. ......... 136/244 |
| 2008/0298104 | A1 | 12/2008 | Sachdeva et al. |
| 2009/0015071 | A1 | 1/2009 | Iwata et al. |
| 2009/0020151 | A1 | 1/2009 | Fornage |
| 2009/0284998 | A1 | 11/2009 | Zhang et al. |
| 2010/0253151 | A1 | 10/2010 | Gerhardinger et al. |
| 2011/0012429 | A1 | 1/2011 | Fornage |
| 2011/0140535 | A1 * | 6/2011 | Choi ..................... H02J 3/32 307/82 |
| 2011/0208372 | A1 | 8/2011 | Hansen |
| 2012/0091817 | A1 | 4/2012 | Seymour et al. |
| 2012/0126623 | A1 | 5/2012 | Koehl |
| 2013/0155735 | A1 | 6/2013 | Ilic et al. |
| 2013/0155736 | A1 | 6/2013 | Ilic et al. |
| 2013/0221753 | A1 * | 8/2013 | Perreault et al. ............... 307/77 |
| 2014/0169053 | A1 | 6/2014 | Ilic et al. |

FOREIGN PATENT DOCUMENTS

| | | |
|---|---|---|
| KR | 1020120130165 A | 11/2012 |
| WO | WO 2010/003941 A2 | 1/2010 |
| WO | WO 2010/037393 A1 | 4/2010 |
| WO | WO 2011/085259 A2 | 7/2011 |
| WO | WO 2011/085259 A3 | 7/2011 |
| WO | WO 2013/112304 A1 | 8/2013 |
| WO | WO 2013/151907 A2 | 10/2013 |

OTHER PUBLICATIONS

U.S. Appl. No. 61/576,363, filed Dec. 16, 2011 of Ilic et al., 20 pages.
B. Johnson, et al., "Photovoltaic AC module composed of a very large number of interleaved inverters," 26th Annual IEEE Applied Power Electronics Conference and Exposition (APEC), pp. 976-981 (Mar. 10, 2011).
A.R. Beig, et al., "A novel fifteen level inverter for photovoltaic power supply system," Industry Applications Conference, 39th IAS Annual Meeting, vol. 2. pp. 1165-1171 (Oct. 3-7, 2004).
O. Alonso, et al., "Cascaded H-bridge multilevel converter for grid connected photovoltaic generators with independent maximum power point tracking of each solar array," 2003 IEEE 34th Annual Power Electronics Specialist Conference, vol. 2, pp. 731-735 (2003).
Rivera, et al., Cascaded H-bridge multilevel converter multistring Topology for Large Scale Photovoltaic Systems, 2011 IEEE International Symposium on Industrial Electronics (ISIE), pp. 1837-1844 (Jun. 27-30, 2011).
Fang Zheng Peng et al., A Multilevel Voltage-Source Inverter with Separate DC Sources for Status Var Generation. Industry Applications Conference, 1995. Thirtieth IAS Annual Meeting, IAS '95, Conference Record of the 1995 IEEE, vol. 3, pp. 2541-2548 (1995).
International search report and written opinion dated Jan. 23, 2013 for PCT/US2012/046251.
European Patent Office Communication enclosing Extended European Search Report for corresponding European Patent Application No. 12810895.8, 9 pp., (Sep. 4, 2015).
Patent Examination Report No. 1 for corresponding Australian Patent Application No. 2012282686, 2 pp., (Nov. 17, 2014).
PCT International Search Report for PCT Application No. PCT/US2013/021350, 4 pp., (May 15, 2013).
PCT Written Opinion of the International Searching Authority for PCT Application No. PCT/US2013/021350, 5 pp., (May 15, 2013).
PCT Third Party Observation for PCT Application No. PCT/US2013/021350, 5 pp., (Dec. 19, 2013).
PCT Notification Concerning Transmittal of International Preliminary Report on Patentability (Chapter I of the Patent Cooperation Treaty) for PCT Application No. PCT/US2013/021350, 7 pp., (Aug. 7, 2014).
First Office Action for corresponding Chinese Patent Application No. 201280044009.1, 19 pp. (including English translation), (Jul. 21, 2015).
AE Techron, "Controlled-Voltage vs. Controlled-Current Modes of Operation", retrieved from the Internet: http://www.aetechron.com/Controlled-current_vs_controlled-voltage_operation.shtml, 1 pg., (2010-2014).
Leopoldo G. Franquelo, et al., "The Age of Multilevel Converters Arrives" IEEE Industrial Electronics Magazine, vol. 2, No. 2, pp. 28-39, (Jun. 2008).
Mihai Ciobotaru, et al., "Control of Single-Stage Single-Phase PV Inverter", EPE Journal, vol. 16, No. 3, pp. 20-26, (Sep. 2006).
Elena Villanueva, et al., "Control of a Single-Phase Cascaded H-Bridge Multilevel Inverter for Grid-Connected Photovoltaic Systems", IEEE Transactions on Industrial Electronics, vol. 56, No. 11, pp. 4399-4406, (Nov. 2009).
Antonio Dell'Aquila, et al., "Overview of PI-Based Solutions for the Control of DC Buses of a Single-Phase H-Bridge Multilevel Active Rectifier", IEEE Transactions on Industry Applications, vol. 44, No. 3, pp. 857-866, (May/Jun. 2008).
Samir Kouro, et al., "Control of a Cascaded H-Bridge Multilevel Converter for Grid Connection of Photovoltaic Systems", 35th Annual Conference of IEEE Industrial Electronics, IECON '09, pp. 3976-3982, (2009).
Second Office Action for corresponding Chinese Patent Application No. 201280044009.1, 20 pp. (including English translation), (Feb. 14, 2016).
Notice of Acceptance for corresponding Australian Patent Application No. 2012282686, 1 pg., (Oct. 27, 2015).
Saeed Golestan, et al., "A D-Q Synchronous Frame Controller for Single-Phase Inverters", IEEE $2^{nd}$ Power Electronics, Drive Systems and Technologies Conference, pp. 317-323, (Mar. 2011).
Third Office Action for corresponding Chinese Patent Application No. 201280044009.1, 21 pp. (including English translation), (Sep. 8, 2016).
Leon M. Tolbert, at al., "Multilevel Convertera for Large Electric Drives," APEC '98, Anaheim, California, Feb. 15-19, 1998, pp. 530-536.

* cited by examiner

SYSTEMS AND METHODS FOR SOLAR PHOTOVOLTAIC ENERGY COLLECTION AND CONVERSION

RELATED APPLICATIONS

This application claims the benefit of priority under 35 U.S.C. §119(e) to Provisional Application Ser. No. 61/506,544, filed Jul. 11, 2011, entitled "SYSTEM AND METHODS FOR SOLAR PHOTOVOLTAIC ENERGY COLLECTION AND CONVERSION," which is incorporated herein by reference in its entirety.

BACKGROUND OF THE INVENTION

Currently, energy generation systems are seeing an increased use of renewable energy sources, such as solar energy. For example, solar energy collection may occur by use of photovoltaics. In order to attain grid-parity for solar photovoltaic (PV) systems in terms of cost, the United States Department of Energy (DOE), for example, has estimated that power conversion equipment, such as a PV inverter, which converters direct current (DC) energy into grid compatible alternating current (AC) energy, should not cost more than $0.10/Watt. The $0.10/W budget for the inverter is all inclusive of the cost of the hardware, installation and operation & maintenance (O&M) over its lifetime. An assessment of the existing PV inverter topologies that are in existence and those that are projected for future developments indicates a striking difference between present and projected cost and the DOE target costs for grid parity. Worldwide, the average selling price of a PV inverter (averaged over all markets and kW sizes) in 2010 was $0.29/W, excluding installation and O&M costs.

Centralized inverters (typically 100 kW and above in size) that aggregate the functionality of DC-to-AC conversion at a single point costs about two to three times less than microinverters or microconverters. However, traditional centralized inverters are not able to capture energy that is lost due to panel to panel variation. Studies have indicated that the uncaptured energy is not only a revenue loss, but may also contribute to a faster rate of PV panel degradation over time, due to higher cell operating temperatures. While microinverters and microconverters cost significantly more than centralized inverters, they have the potential to increase system performance by significantly improving the granularity of the maximum power point tracking functionality since they are, typically designed to interface to only one single PV panel. Despite their perceived performance enhancement capabilities, present microinverter or microconverter solutions are priced significantly outside of the DOE's grid-parity targets.

Therefore, despite recent resurgence of activity in the PV inverter technology space with a plethora of a new topologies and architectures being proposed, a need exists for a solution that is able to achieve significant cost reductions while being able to retain the perceived benefits of microinversion or microconversion. A further need exists for energy efficient solar energy collection without compromising the power conversion efficiency. Systems and methods disclosed herein meet these needs and are able to derive further benefits from the proposed architecture which, cumulatively, result in additional system cost reduction for the overall solution.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
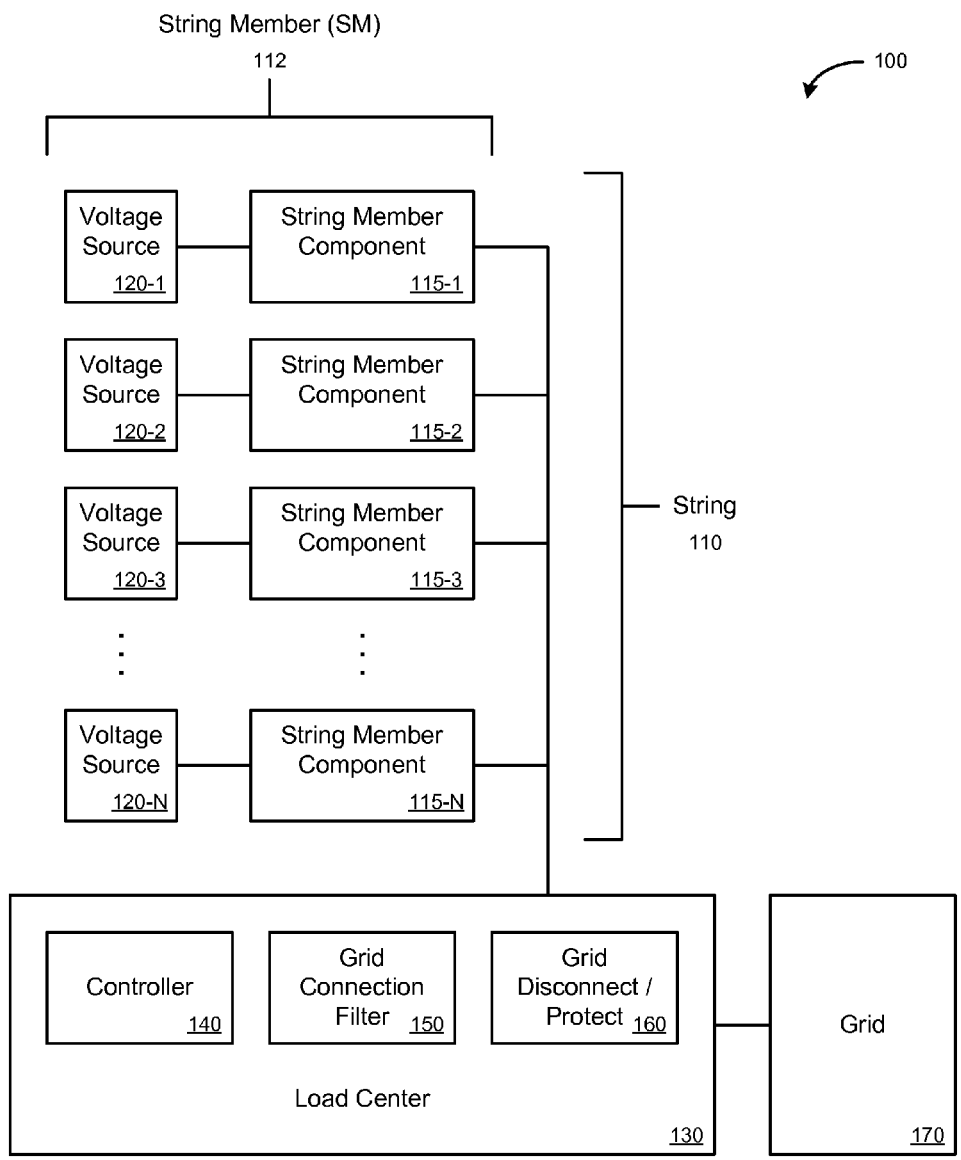
FIG. 1 illustrates an example energy collection and conversion system, under an embodiment.

Embodiments described herein provide for an energy collection and conversion system for efficiently converting energy and maximizing power output. As described herein, the energy collection and conversion system can efficiently convert direct current (DC) energy into alternating current (AC) energy by reducing the number conversions that take place within the system. In addition, while embodiments described herein refer to PV panels as energy source input (s), the concept can be extended, by those of ordinary skill in the art, to other kinds of energy collection/generation or energy storage systems.

In some embodiments, the system can enable low voltage integration of semiconductor components onto the same silicon die in order to significantly drive down costs while retaining the benefits of both central inverters and microinverters (namely, lower cost and higher efficiencies of central inverters and higher flexibility and panel level optimization of microinverters). In particular, the system provided can reduce costs, maximize performance, and increase reliability for collecting and converting energy from renewable energy sources.

Embodiments recognize that while microinverters are able to address many shortcomings of central and string inverters, typical microinversion or microconversion can result in penalties to be paid in terms of: (a) lower efficiency of power conversion, (b) increased cost per watt, and (c)

lower reliability. For example, with respect to (a) lower efficiency of power conversion, some manufacturers claim that they are able to compensate for the lost watts by increasing the overall harvesting of the uncaptured kWhrs or energy due to lack of panel-level optimizers with central inverters or even string inverters. This claim by the microinverter manufacturers is difficult to corroborate for most operational circumstances and easy to refute in some scenarios, especially given tighter manufacturing tolerances by panel vendors. It can be shown that for low fill-factor PV technologies, such as thin-film panel-level optimization, it alone has very minimal benefits in terms of additional energy harvest, and even less benefits if the arrays constitute panels from one or similar bins.

In addition, many commercial installations also benefit from better site locations that are typically devoid of occlusion or shadowing. For most large commercial installations, due to insufficient panel variation or since panels within an array belong to the same bin, microinverters may not be able to gather substantially more energy than central or string inverters even for somewhat higher fill-factor panels, such as multi-crystalline Si. However, additional energy harvest purely due to panel level optimization may be feasible for higher fill-factor panels, such as mono-crystalline Si (SUN-POWER) or multi-junction cells based concentrating PV or CPV panels. While multi-junction cells are the highest efficiency PV cells, the CPV panels suffer more from panel mismatch issues because it is more difficult to maintain critical panel fabrication uniformity due to optical and mechanical tolerance stack-up in the manufacturing processes.

Embodiments further recognize that with respect to (b) increased cost ($/W), the economies of scale benefit the central inverter products more than those offered by the volume pricing advantages for the microinverter or microconverter products. Despite their higher cost, microinverters, in most cases, are able to eliminate the additional cost associated with the installation of a central inverter. For example, central inverters in the power range of >200 kW are being offered at prices ranging from $0.17/W-$0.25/W (excluding O&M costs) depending on the manufacturer, availability, and ease of installation attributes, wire/string/home-run landing capabilities and grid-tie interlocking mechanisms. These inverters are benefitting from consolidating the power handling and conversion circuitry into single-blocks/bridge/phase-arms of insulated gate bipolar transistors (IGBTs), high current-handling inductors, transformers, or other magnetic and various filter components, and subsequently, are able to obtain lower cost of manufacturing by economies of scale. Unfortunately, the consolidation of circuitry and passive components, such as large inductors, transformers, and filters also renders them extremely bulky, difficult for transportation and expensive in their installations despite their lower capital/initial cost.

Currently, microinverters/microconverters are not yet benefitting from the increased volume purchasing influence of their components. Accordingly, they are typically priced at the higher end of the $0.55/W-0.85/W range. Smaller installations, such as residential or light commercial installations, may absorb the additional first or hardware cost in order to circumvent site related shortcomings, such as shading and occlusion of PV panels due to adjacent buildings or trees, lack of adequate roof area for long strings, while benefitting from the relative ease of connectivity to the grid without having to dedicate any surface area (land or wall) for the footprint of string or centralized inverter(s). However, for larger installations, the significant cost-differential with respect to central inverters are difficult to justify. Thus, based on present pricing structure microinverters may be restricted to only smaller sized residential or light commercial installations. A significant barrier to component (active semiconductor) integration is the requirement for high voltages in the circuit. High voltage step-up is required in order to attain voltage compatibility with that of the electrical grid.

Embodiments also recognize that the shortcomings with respect to (c) lower reliability can be attributed to a variety of factors. These factors include (1) numerous components in the topology, (2) associated solder joints, (3) low life of capacitors (e.g., electrolytic, evaporative), and (4) bending stresses on the board (PCB) due to thermal expansion and contraction. Currently, manufacturers are adopting film capacitors (instead of electrolytics) in their designs. However, discrete component count still remains high for being able to increase reliability. High voltages in the main conversion circuitry negatively impacts reliability. First, it is difficult to integrate high voltage semiconductor silicon components, and second, it causes high switching stresses for the semiconductor switches. Semiconductor component integration, in particular, which utilizes well established, low cost and high reliability silicon processes may be able to increase system reliability, but component integration for high voltage circuits generally remains cost prohibitive.

According to one or more embodiments, the system can utilize a small number of conversions (e.g., one, two, three, five or less, etc.) in converting the energy from DC to AC. By using a small number of conversions (e.g., one conversion) and/or by eliminating the need for voltage step-up operation, the system can have the highest efficiency possible, or have an increased efficiency. The system can incorporate available or commonly available commodity semiconductor switches to reduce costs. For example, 50V-100V breakdown voltage rated metal-oxide-semiconductor field effect transistors (MOSFETs) can be used for improving the purchasing influence for PV conversion and for reducing the conversion loss in the silicon semiconductor-based power switches due to their significantly lower on-state drop (characterized as an ohmic loss component known as $R_{DS(on)}$) and comparatively lower switching losses (due to improved Figure of Merit (FOM) of these switches). By using high efficiency, low voltage MOSFETs, the system can increase switching frequency by an order of magnitude(s) as compared to the state-of-the-art to substantially increase power density, and, thus, subsequently reducing cost. They may also be able to eliminate or reduce the cost of heat sinking significantly, and/or be able to reduce size, weight, volume of magnetics to reduce cost.

Still further, the system can also increase reliability by reducing evaporative capacitor storage requirements in some embodiments. Additionally, integrating most or all semiconductor components, including high-side drivers, can also increase the reliability of the system. Furthermore, high conversion efficiency may lead to reduced overall losses and/or potentially increase reliability.

The system can also retain the benefits of the microinverters' panel level optimization capabilities. Such features may be advantageous in order to improve and enhance the system performance. For example, provision(s) in the circuitry can differentially handle higher performing panels separately from those that are performing at a lower level. In other embodiments, the system can be capable of retaining or even increasing the home-run (e.g., residential installation) power loading ability and the simplicity of installation of conventional or state-of-the-art systems, so as not to increase the cost of field wiring. The system can be capable of handling at least the same number of panels on each equivalent home-run power systems.

Still further, in accordance with some embodiments, systems and methods for energy collection and conversion can integrate as many components as possible for grid-tie capabilities. This can result in consolidation of components and reduction in cost. For example, this can include consolidation of switchgear and interlocking components. The systems and methods can be provided to have no more enclosures in the installation than that of a microinverter installation. For example, points of integration can be allowed like DC combiner boxes in conventional centralized inverter systems and load centers in microinverter systems.

According to embodiments, the energy collection and conversion system includes one or more strings that is connected to an electrical load. Each of the strings comprises a plurality of string members that are coupled to each other in series. The string members are configured to absorb/generate DC energy from/into a voltage source, such as a PV panel or battery, and convert the DC energy into AC energy.

In some embodiments, each of the string members comprises a voltage source and an inverter (or microinverter) that is configured to convert the DC energy into AC energy. The AC output of the string members can be combined to provide a combined AC energy to the electrical load. The electrical load can include an interface to couple to an electrical grid, can be a part of the electrical grid, or can be configured as part of an AC generation system (e.g., a stand-alone power system, AC motor drives, AC resistive loads). For example, the combined output can be coupled to a load center or termination box that can be coupled to the electrical grid.

In one embodiment, a microinverter can support a single solar photovoltaic (PV) panel, or can support a plurality of PV panels (e.g., a large number of PV panels that are connected to a single inverter). In some embodiments, the shading of any one solar panel, or a panel failure, need not disproportionately reduce the output of an entire solar panel array. Each microinverter can act as a maximum power point tracker for its connected panel.

According to one or more embodiments, the combined AC output of the string members can be controlled by a controller. In one implementation, the controller can be a master controller that is provided with or as part of the electrical load and can communicate control signals to each of the string members for controlling the AC output of the system. The string members can each include a control circuit that can receive the control signals from the master controller.

In other embodiments, each of the individual string member can include at least one PV panel that is configured generate a DC voltage, and a DC-to-AC inverter. For example, the systems provided can be incorporated as part of a residential or commercial installation so that a plurality of PV panels can be configured to receive sunlight and generate DC energy. The system can convert DC energy into AC energy at the panel level in a single stage conversion, and series sum the AC voltage of each of the individual string members to couple to the electrical grid. By converting the energy from DC to AC at the panel level prior to providing the voltage to the string, no separate centralized AC conversion component is necessary.

According to embodiments, the DC-to-AC inverter of each individual string member can be configured to convert the DC voltage into an AC voltage that has a voltage magnitude output that is dependent on the voltage of the photovoltaic panel, convert the DC voltage into an AC voltage that has a phase output that is dependent on a phase reference determined by a controller in relation to the phase quantity of the electrical grid or AC generation system, and/or convert the DC voltage into an AC voltage that has a frequency output that is dependent on a frequency reference determined by the controller in relation to the frequency quantity of the electrical grid or AC generation system. The string members can also include an additional voltage magnitude and/or phase adjustment mechanism, such as a step-up or step-down circuit for the controller to differentially manage the DC voltage of each string member in relation to other string members on a string.

In some embodiments, conversion from DC energy to AC energy can be achieved at a panel level without any voltage boosting operation or requirement (e.g., by each string member). Thus, the current that is impressed on a string can be the same as that at the output of each string member (e.g., the AC source). The voltages of these AC sources can also be varied to handle their respective power generation ability and can also be summed to be adequately and sufficiently compatible with the grid voltage. In addition, in other embodiments, the voltages of these AC sources can overcome the inherent voltage drops that correspond to the string current, that are in the wires, that are circuitry, and/or that are in other grid-tie components.

In many grid interactive applications, per their regulatory requirements (UL 1741, IEEE 1547), such PV systems can be required to support or be required to stay interfaced to the grid even under low or high grid conditions, e.g., such as ±10% below or above nominal. Such exacting grid conditions or requirements may have to be satisfied even when the PV voltages are substantially lower than nominal if the grid conditions happen to coincide with the peak sunlight exposure hours when the ambient temperatures are high and the nominal cells temperatures of PV panels are also driven high. Since PV voltage follows a negative temperature coefficient of voltage (−0.35%/° C. for crystalline-Si), PV voltage output decreases as PV cell operating temperature increases. Under such conditions, for example, it is conceivable that depending upon the PV panel voltage specifications, approximately 30 AC sources may be required each, on an average, contributing approximately 17.6 Vrms and under nominal conditions approximately only 16 Vrms. The voltages of the components inside these distributed AC sources may be significantly lower than the voltages for traditional microinverter arrangements. In some instances, examples of these low voltages may include voltage values of 10 Vrms or less, 11 Vrms or less, 12 Vrms or less, 13 Vrms or less, 14 Vrms or less, 15 Vrms or less, 16 Vrms or less, 17 Vrms or less, 18 Vrms or less, 19 Vrms or less, 20 Vrms or less, 25 Vrms or less, 30 Vrms or less, 35 Vrms or less, or 50 Vrms or less. In some embodiments, by enabling DC-to-AC conversion at the panel level and then summing the AC voltages for grid compatibility, no need exists to step up the voltage. This, along with the additional benefit of being able to utilize low $R_{DS(on)}$ and high FOM MOSFETs due to the low operating voltage, can help to reduce conversion losses typically associated with microinverters.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

Other goals and advantages of the system will be further appreciated and understood when considered in conjunction with the following description and accompanying drawings. While the following description may contain specific details describing particular embodiments of the system, this should not be construed as limitations to the scope of the invention, but rather as an exemplification of preferable embodiments. Many variations are possible, in particular, by applying the duality principle of electrical engineering, as suggested herein that are known to those of ordinary skill in the art. A variety of changes and modifications can be made within the scope of the invention without departing from the spirit thereof.

System Description

FIG. 1 illustrates an example energy collection and conversion system, under an embodiment. A system such as described can be implemented in various contexts. Embodiments provide for an energy collection and conversion system that can maximize photovoltaic panel power output. Embodiments further provide DC-to-AC conversion for an electrical grid compatible output.

In one embodiment, system 100 includes one or more strings 110 and a central load center 130. The load center 130 can include an interface to couple to an existing electrical grid 170, or alternatively can include an interface to couple to a stand-alone power system, an AC motor drive, and/or other AC resistive loads. For simplicity purposes, only one string 110 is illustrated in FIG. 1. Multiple strings 110 can be coupled to the load center 130 depending on various implementations. Each string 110 includes a plurality of string members (SMs) 112 that can be connected to each other in series (e.g., N string members, where N is 1 or greater). In other embodiments, various configurations of SMs 112 can be provided, such as two or more SMs 112 being connected to each other in parallel and/or two or more SMs 112 being connected to each other in both series and parallel. Each SM 112 comprises a string member component 115 and a voltage source 120.

According to embodiments, the voltage source 120 for an SM 112 can be photovoltaic (PV) panel(s) for receiving sunlight and generating a DC voltage. In other embodiments, the voltage source 120 can be an energy storage system, such as batteries, flywheels, a fuel cell, or other energy source that is capable of producing DC voltage as an output either directly or indirectly, if producing AC, with the means of an AC to DC interfacing circuit. For example, system 100 can include ten SMs 112 as part of a string 110 (e.g., N=10) that are connected in series, with each voltage source 120 being a PV panel for generating energy from sunlight. The system 100 can be used to convert DC energy into AC energy at the PV panel level (e.g., at each SM 112) in a single stage conversion, and sum the voltage that is output from each SM 112 on the string 110 in order to couple to the electrical grid 170.

In some embodiments, each of the string member components 115 includes an inverter or microinverter that is configured to receive the DC voltage that is generated by the respective voltage source 120 and convert the DC voltage into AC voltage. The AC voltage (with its phase) can be outputted by each of the string member components 115, so that the plurality of outputs can be consolidated as a single combined AC output for the respective string 110. The combined output can be provided to the load center 130. Each string member component 115 includes other components that will be described in later figures.

System 100 also includes one or more controllers 140, one or more grid connection filters 150, and one or more grid disconnect/protects 160 that can be incorporated as part of the load center 130. In other embodiments, the controllers 140, the grid connection filters 150, and/or the grid disconnect/protects 160 can be provided separately from the load center 130. The controller 140 can communicate with individual string member components 115 in order to coordinate the outputs of each SM 112 to achieve the desired power and overall energy based on the performance or operation of each SM 112. For example, the controller 140 can provide individual control signals to each of the individual string member components 115 to dynamically control the conversion at each SM 112. In one embodiment, each string member component 115 can include a control and communication block for receiving control signals from the controller 140.

In some embodiments, individual string controllers can be provided (e.g., multiple controllers 140, resident inside or outside of the string, so that each string 110 has a corresponding controller 140). The individual string controllers may be connected to one another in parallel, and/or in series. In other embodiments, the controller 140 can be provided for multiple strings 110 based on the available controller 140 bandwidth for computation and communication. In implementations with multiple string controllers, each string controller may or may not communicate directly with one another. In such cases, the plurality of string controllers can also communicate with a master controller 140.

Based on the control signals provided by the controller 140, each of the one or more strings 110 can be caused to output a certain AC voltage having a certain phase to the load center 130. The output from a string 110 (e.g., from the combined output of individual SMs 112) can be provided to a respective grid connection filter 150, which can then be connected to a respective grid disconnect/protect 160. In some embodiments, multiple strings 110 can be coupled to a single grid connection filter 150 and/or a single grid disconnect/protect 160. The grid connection filter 150 can be coupled to the string 110 to provide an interface for providing the output from the string 110 (e.g., sum of the voltage and/or current) to an existing electrical grid 170 (e.g., the sum of the current that is outputted from individual SMs 112 can pass through the grid connection filter 150). In some embodiments, the load center 130 can provide an interface for providing the output from the strings 110 to one of a stand-alone power system, AC motor drives, and/or AC resistive loads (e.g., instead of coupling the strings 110 to the grid 170).

In some embodiments, the grid connection filter 150 is coupled to the grid disconnect/protect 160. The grid disconnect/protect 160 can provide protection for the system 100 during instances of grid fault and/or low or high PV conditions. During these faulty conditions, the controller 140 can cause a break in the circuit via the grid disconnect/protect 160 for protecting the system 100. Alternatively, the grid disconnect/protection control mechanism can be independent of the string controller(s) 140 and may be resident inside the grid disconnect/protect block 160. For example, the load center 130 can be at least a part of a termination box or circuit breaker of a residence or commercial building. The grid disconnect/protect 160 can include one or more grid disconnect switches (and one or more inductors) that can be controlled by the controller 140 or separately by its own disconnect/protect controller inside 160 during a grid fault and/or low or high PV conditions.

According to one or more embodiments, the system 100 can be a solar photovoltaic energy collection and conversion system. For example, the string 110 can include a plurality of SMs where each of the voltage sources 120 can be a PV panel. In such an embodiment, energy from PV panels can be maximized and the load center 130 can provide grid 170 interfacing and synchronizing capability (e.g., called distributed AC coupling power maximizer or AC-stacking, for simplicity). For other grid interactive or loading applications, such as battery cells or ultracapacitor-based energy storage systems that require optimization of multiple energy or generation sources, a similar architecture can address and optimize the individual battery cells or ultracapacitors for their charge and discharge profiles while servicing a required power demand. Additionally, such a system or method can serve the needs of a fuel cell power generating stack where variations of individual fuel cell can be differentially handled while satisfying the load power demand.

By controlling the outputs of individual SMs 112 in a string 110, the system 100 can improve and enhance the performance of collecting and converting energy for a variety of different uses.

FIGS. 2A-2D illustrate an inverter or microinverter, according to an embodiment. Inverter 210 of FIG. 2A can be included in one or more string members to convert DC energy into AC energy. For example, the DC terminal of inverter 210 can be connected to a PV panel to receive an output from the PV panel. Inverter 220 of FIG. 2B and inverter 230 of FIG. 2C also illustrate inverters that can be included in the plurality of string members. In some embodiments, inverters 220 and 230 can include other components and/or circuits that are not illustrated for simplicity purposes.

Figure 2A:
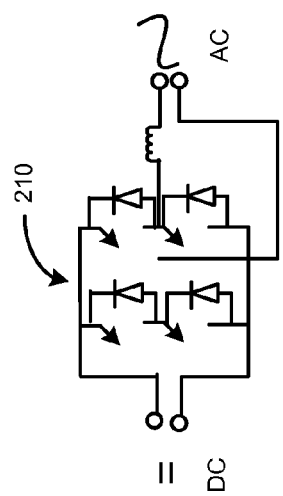
FIGS. 2A-2D representations of an inverter, microinverter or H-bridge, according to an embodiment described herein.
Figure 2B:
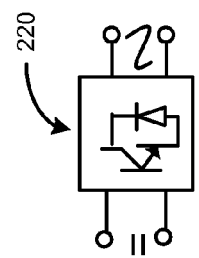
Figure 2C:
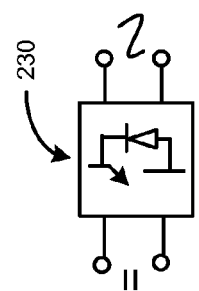
Figure 2D:
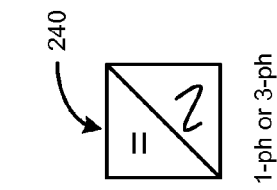

FIG. 2D illustrates another inverter 240 that can be included in one or more string members. Other components can be included in the inverter 240. For example, inverter or microinverter 240 can represent an inverter that is included in a string member (SM) 112 (of FIG. 1), or can represent an inverter/microinverter that is also coupled to a voltage boost or buck circuit (e.g., a circuit for performing a voltage boost or buck operation). In one embodiment, the voltage boost or buck circuit can receive control signals from the controller 140 in order to route power from individual PV panels, for example, to the grid differentially and based on the capability of the individual PV panels. In addition, each of the inverters 210, 220, 230, 240 can also be configured for single-phase power systems (1-ph), three-phase power systems (3-ph), or other multiple phase power systems.

Figure 3A:
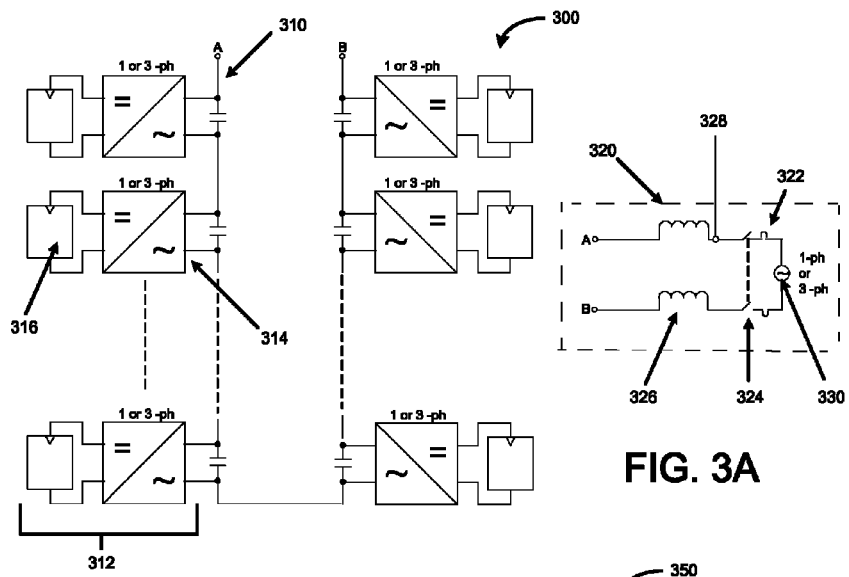
FIGS. 3A-3B illustrate examples of an energy collection and conversion system that include a load center or termination box, under various embodiments.
Figure 3B:
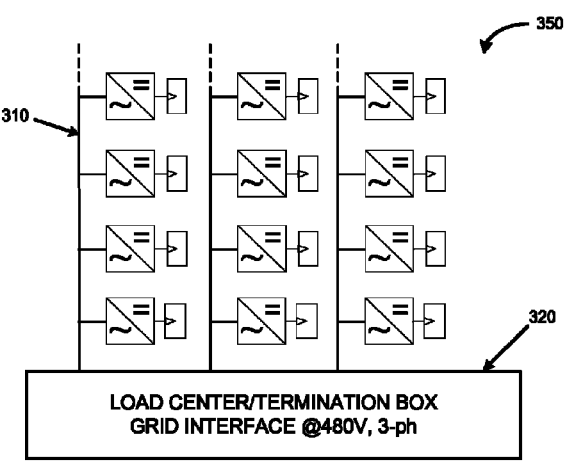

FIGS. 3A-3B illustrate examples of an energy collection and conversion system that include a load center or termination box, under various embodiments. The systems such as described by embodiments of FIGS. 3A-3B can be implemented using, for example, components described with embodiments of FIGS. 1 and 2. FIG. 3A illustrates a system 300 that includes a string 310 that is coupled to a central load center or termination box 320. Additional strings 310 can be coupled to the load center 320, but are not illustrated in FIG. 3A for simplicity purposes (e.g., the load center 320 can be coupled to one, two, three, four, twenty, thirty, fifty or more, etc., strings 310). The strings 310 can be coupled to the load center 320 in parallel, in series, or in any combination thereof.

Each string 310 includes one or more string members (SM) 312 that are coupled to each other in series. In different implementations, however, the SMs 312 can be coupled to each other in parallel, in series, or in any combination thereof. In one embodiment, each SM 312 can include a DC-to-AC inverter or microinverter 314 that is coupled to a voltage source 316 (e.g., a PV panel). The voltage source 316 can provide a DC output to the microinverter 314, so that each SM 312 can output an AC voltage to the string 310. Each SM 312 can output a low-voltage, which can include any of the voltage values as described in this application.

The string member components 314 illustrated in FIGS. 3A and 3B, for example, can be configured for a single-phase power system or for multiple-phase power systems, such as a three-phase power system. For implementing three-phase string member component 314 embodiments, the configuration of the string 310 and the SMs 312 can require more components, such as more switches and/or magnetic components, and can require a particular wiring arrangement. For simplicity purposes, a single-phase implementation is discussed in the application.

In some embodiments, a single load center 320 can be provided per solar PV energy collection and conversion system 300. Alternatively, a plurality of load centers 320 can be provided. In such implementations, the plurality of load centers 320 can be connected to each other in parallel, in series, or in combination thereof. The load center 320 can include one or more circuit breakers 322, one or more grid disconnect switches 324, and one or more magnetic components 326 (e.g., one or more inductors). In some instances, the load center 320 can include or be part of a switchgear, and one, two, or more inductors along the switchgear can be used as passive power components. The load center 320 can also include a controller (or alternatively, multiple controllers, such as one controller per string 310) that can provide commands for controlling the combined AC output of the string 310 and/or the individual AC outputs of the individual SMs 312. In addition, the controller can provide, for example, control signals 328 for controlling the power factor (PF) of the system 300 and/or for controlling the maximum power point tracking (MPPT) of the system 300. During instances of grid fault and/or low or high PV conditions, the controller can cause a break in the circuit by controlling the one or more grid disconnect switches 324.

The load center 320 can also interface the system 300 to an existing electrical grid 330. In various embodiments, the electrical grid 330 can be configured for a single-phase power system or for a three-phase power system. By controlling the string 310 and the individual SMs 312, the load center 320 can enable the system 300 to have grid compatibility and connectivity.

FIG. 3B illustrates a system 350 that includes three or more strings 310 that are coupled to a central load center or termination box 320. In this embodiment, the load center 320 includes a grid interface for interfacing the system 350 to an existing 480 V, three-phase electrical grid (not shown in FIG. 3B). Depending on various implementations, the load center 320 can include individual string controllers for each of the three strings 310 and/or include a consolidated string controller for multiple strings based on available controller bandwidth for computation and communication. For simplicity purposes, the three strings 310 illustrated are representative of the three single-phase strings to constitute a three-phase power system, but in reality, could be additional strings and/or configurations for implementing a three-phase system 350. In other embodiments, system 350 can include a plurality of load centers 320. In these embodiments, the plurality of load centers 320 can be connected to each other in parallel, in series, or in combination thereof.

Figure 4:
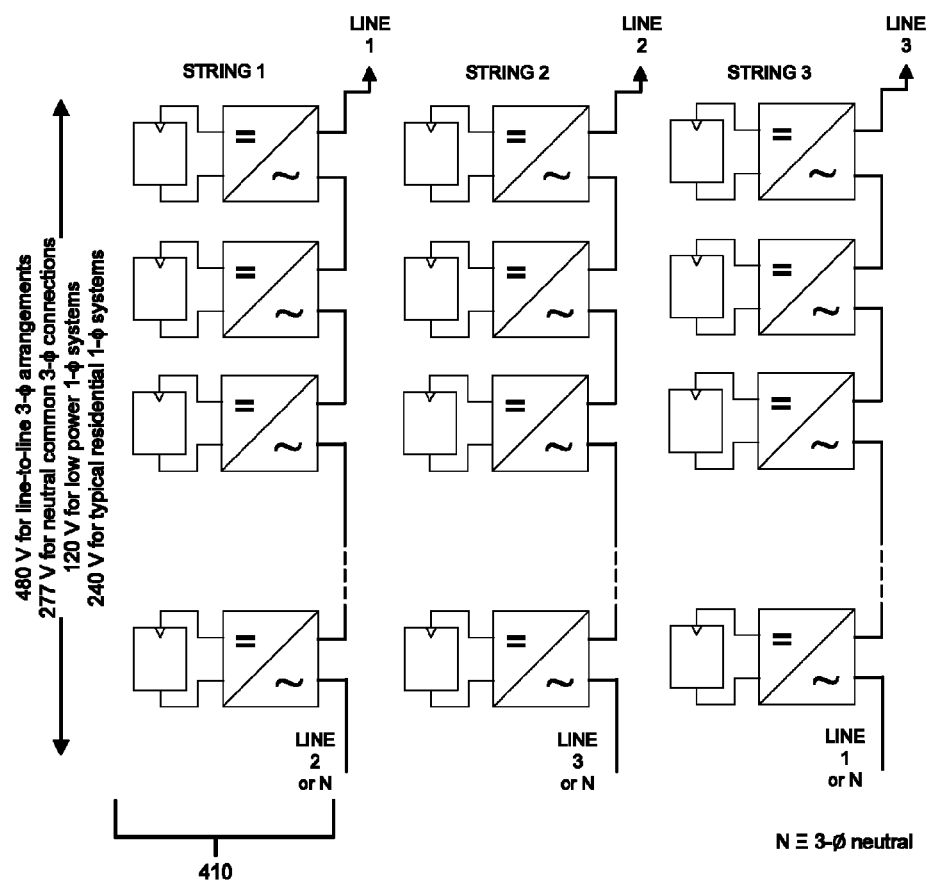
FIG. 4 illustrates an example system having single-phase strings in a three-phase configuration, under an embodiment.

FIG. 4 illustrates an example system having single-phase strings in a three-phase configuration, under an embodiment. The system such as described by embodiments of FIG. 4 can be implemented using, for example, components described with embodiments of FIGS. 1-3B. In one embodiment, each string (e.g., String 1, String 2, String 3) includes one or more string members 410 that are coupled to each other in series. Depending on the implementations, the strings can be connected to each other in different configurations.

For example, the strings can be grounded in a Y-connected system, or left ungrounded and connected line-to-line in a delta-connected system. In some embodiments, the strings illustrated in FIG. 4 can be arranged to have 480 V for line-to-line three-phase arrangements, 277 V for neutral common three-phase connections, 120 V for low power single-phase systems, or 240 V for typical residential single-phase systems. String 1, String 2, String 3 can also be arranged to be coupled to a load center (not shown in FIG. 4).

The load center can house an AC disconnect, a circuit breaker, string controllers and/or master controller, and/or other components for controlling the output of the individual SMs 410 and the output of each string (e.g., String 1, String 2, String 3). In some embodiments, the load center does not require additional active power components, but can include inductors (e.g., one or two inductors) along with a switchgear (e.g., the inductors along the switchgear can be used as passive components). In other embodiments, the grid disconnect function can constitute active switching components along with other passive components.

In addition, the system illustrated in FIG. 4 (as well as the systems 300, 350 of FIGS. 3A-3B) can include an increased panel packing factor, i.e., the number of panels on the same home-run equipment. The stringing arrangement provided for an energy collection and conversion system can include the configurations provided in FIGS. 3A-4, and can be configured for line-to-line operation. The strings can also handle the one-one voltage of 480 $V_{AC}$ (or any other AC voltage).

Due to the complexity of the circuit realization for a three-phase version system, only single-phase implementation is discussed in the following pages. However, any descriptions herein of the single-phase implementation can also be applied to three-phase implementations, or any N-phase implementation where N is a positive whole number or an integer.

Figure 5:
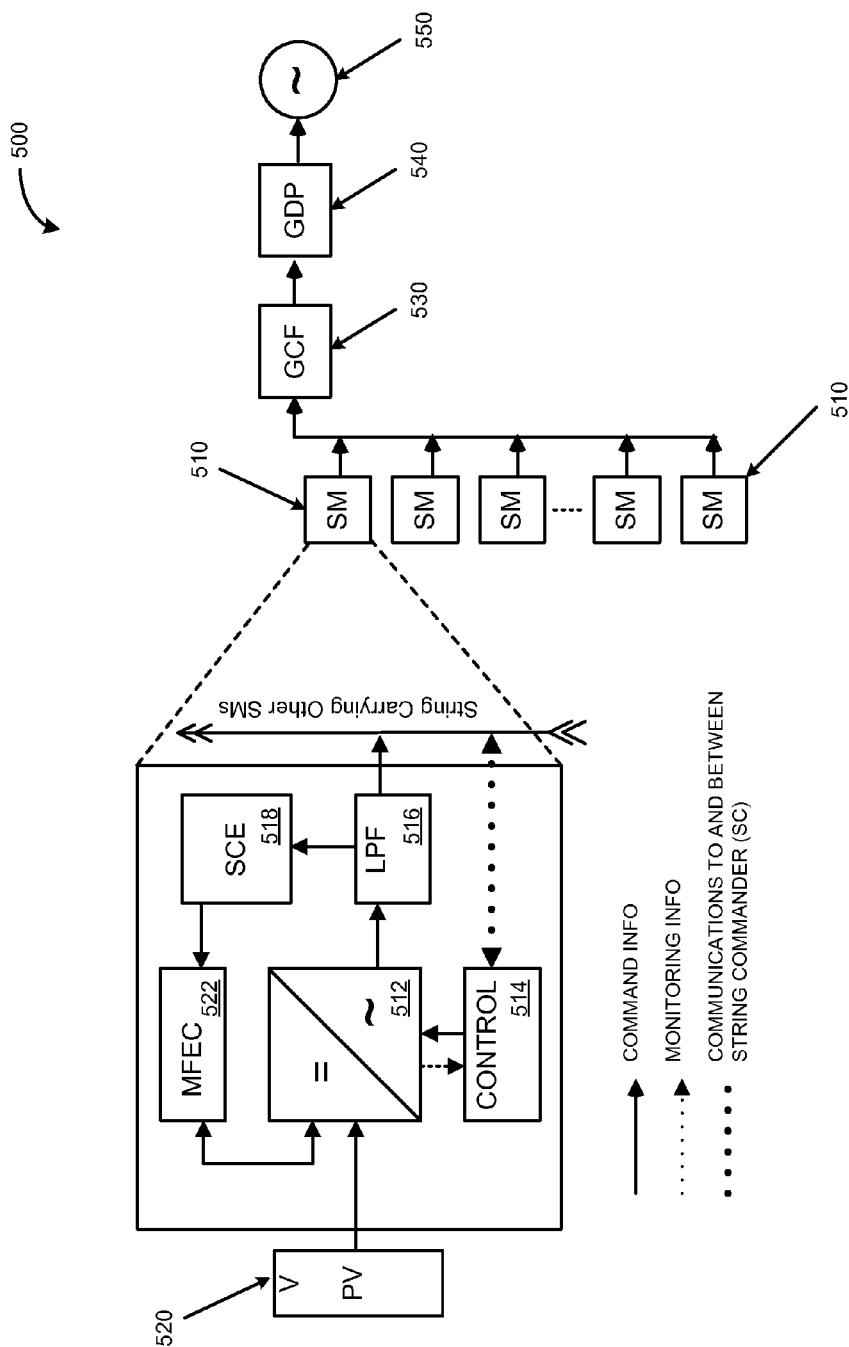
FIG. 5 illustrates an example energy collection and conversion system illustrating details of a string member, according to an embodiment.

FIG. 5 illustrates an example energy collection and conversion system illustrating details of a string member, according to an embodiment. In some embodiments, the main blocks can be provided within a string member. In other embodiments, the main blocks can be distributed over multiple string members and/or other components. Additional blocks can also be provided to the main blocks illustrated in FIG. 5. In addition, while embodiments describe the SMs 510 to have the same components as other SMs 510 of the same string, other embodiments provide for SMs 510 to include different components. The components or blocks of FIG. 5 can enable the system 500 to efficiently convert energy and maximize power output.

As discussed, some objectives of the energy collection and conversion system (e.g., when configured in a single-phase string configuration) include: (1) using the least number of conversion stages (e.g., ideally one conversion stage), (2) using small passive components to reduce cost, weight, volume increased power density, (3) sharing/equalizing current from a string member to other string members on the same string, (4) synchronizing current generation among the string members in order to synchronize the current with the existing electrical grid, (5) handling power balancing requirements (e.g., additional requirements for single-phase connection of string members is the need to handle 120 Hz, or twice the grid fundamental frequency power demanded by the grid current while maintaining DC operation at the panel level and generating 60 Hz current for the 60 Hz voltage on the grid), and (6) adjusting the power output of each string member at its maximum power point ($P_{MP}$) irrespective of the other string members' power operating point. In one embodiment, a solar PV energy collection and conversion system as described in FIG. 5 can address one or more of the objectives using a variety of different components. In embodiments that interface to 50 Hz electrical grids the power balancing circuit can be required to handle 100 Hz power.

In system 500, a string includes a plurality of string members (SMs) 510 that are coupled to each other in series. The string is coupled to a grid connection filter (GCF) 530, which is then connected to a grid disconnect and protect (GDP) 540. In some embodiments, the GCF 530 and the GDP 540 can be included in a load center or termination box (not shown in FIG. 5). The GCF 530 and the GDP 540 can be configured to provide an interface for the string to provide a combined AC output to an existing electrical grid 550. Although system 500 can include multiple strings coupled to the load center (or coupled to the GCF 530 and/or the GDP 540), only one string is illustrated for simplicity purposes.

The GCF 530 can provide an interface for providing the output from the string (e.g., sum of the voltage and/or current) to the electrical grid 550. In an alternative embodiment, the load center can provide an interface for providing the output from the string to one of a stand-alone power system, AC motor drives, and/or AC resistive loads (e.g., instead of coupling the string to the grid 550). The GDP 540 can provide protection for the system 500 during instances of grid fault and/or low or high PV conditions.

According to one or more embodiments, an individual string member 510 can include a DC-to-AC inverter 512, a control block 514, a low-pass filter (LPF) 516, a string current equalizer (SCE) 518 and a multi-frequency energy coupler (MFEC) 522. A voltage source 520 can also be coupled to the DC-to-AC inverter 512 in each SM 510. In some embodiments, these recited components of the SM 511 can be provided in, for example, a string member component 115, as described with respect to FIG. 1. In other embodiments, multiple PV panels 520 can be coupled to the inverter 512 and/or a single SM 510. The DC-to-AC inverter 512 can also include a boost/buck circuit and/or a DC-to-AC H-bridge inverter (not shown in FIG. 5).

System 500 can also be a solar PV energy collection and conversion system that includes a plurality of PV panels. The voltage source 520 of each SM 510, for example, can be a PV panel. As a result of exposure from sunlight, for example, a PV panel 520 can provide a DC output to an inverter 512 for each SM 510.

In one embodiment, the DC-to-AC inverter 512 can be in communication with a controls/communications block 514. One or more electrical signals can pass between the DC-to-AC inverter 512 and the controls/communications block 514. The electrical signals can include command information that can be exchanged for controlling the DC-to-AC inverter 512 (and in turn, an individual SM 510). For example, the commands can control one or more parameters relating to converting a DC voltage to an AC voltage. Such parameters can include the voltage that the DC-to-AC inverter 512 can operate at, and/or the current amounts that the DC-to-AC inverter 512 can operate at. In some embodiments, monitoring information can be passed from the DC-to-AC inverter 512 to the controls/communications block 514. Such monitoring information may provide feedback to the controls/communications block 514 in order to better maintain or alter the commands provided to the DC-to-AC inverter 512. Thus, in each SM 510, depending on different implementations, a one-way communication can be provided from the controls/communications block 514 to the DC-to-AC inverter 512, a one-way communication can be provided from the DC-to-AC inverter 512 to the controls/communications block 514, or two-way communications can be provided between the controls/communications block 514 and the DC-to-AC inverter 512.

The controls/communications block 514 can also communicate with other control blocks 514 of other SMs 510. According to embodiments, the controls/communications block 514 can receive instructions from an overall controller, and/or the controls/communications block 514 can permit synchronized current generation among the SMs 510. In some embodiments, the overall controller can be a string controller that may or may not communicate with a system-wide master controller, or can be a master controller of the system 500. In other embodiments, the controls/communications block 514 of one of the SMs 510 can be dynamically delegated as being a master controls/communications block 514 while the other controls/communications blocks 514 of the other SMs 510 within the string are configured to be slave controls/communications block 515. Each controls/communications block 514 can also be capable of adjusting the power output of its respective SMs 510 at its maximum power point or an improved power point.

The DC-to-AC inverter 512 can also communicate with a multi-frequency energy coupler (MFEC) 522. In order to meet the requirements of the double frequency (120 Hz) power on the grid when the PV panel 520 is only generating DC power, for example an energy storage can provide the necessary power balancing between the DC input (from the PV panel 520) and AC output (to be outputted by the SM 510). In addition, because the system can be based on low voltage circuits and components, if the energy storage was placed on the low voltage bus, the required capacitor with the high capacitance can be prohibitively expensive. Because energy stored in a capacitor is proportional to the square of the voltage of the capacitor, it may be beneficial to increase the voltage of energy storage to significantly reduce the energy storage passive element, i.e., the capacitor in the system. In order to reduce the required capacitance, a higher voltage bus may be created where the energy may be stored in a capacitor of a lower capacitance. The MFEC 522 can allow for a low cost means for energy storage necessary for DC to double the frequency power balancing.

In one embodiment, energy storage can occur on a string member level (e.g., at each SM 510). In some situations, the grid demand can be lower than the energy delivered by a PV panel 520. In such situations, energy can be stored by using the MFEC 522. Alternatively, in cases where the grid demand is higher than the energy delivered by the PV panel 520, energy can be used from the energy storage. The MFEC 522 can be capable of handling and/or accommodating the DC energy supplied by the voltage source 520 and the AC energy that is delivered to the grid 550. Because the MFEC 522 can permit increased voltage, which can result in reduced capacitance, high-reliability capacitors can be used for the energy storage. This can provide advantages over electrolytic energy storage configurations. In alternate embodiments, electrolytic energy storage can also be used (or be used in place of the high-reliability capacitors). The MFEC 522, if supplemented with additional capacitance, can also provide increased grid stability functionalities such as, reactive power compensation, power factor correction, voltage sag ride through and/or other similar grid disturbance prevention that are being gradually mandated by utilities.

In some embodiments, command/communication signals can also be exchanged between the MFEC 522 and the DC-to-AC inverter 512. These communications can be a two-way communication, or one-way communication/commands from the DC-to-AC inverter 512 to the MFEC 522, or vice versa. In other embodiments, the MFEC 522 can directly receive control signals from the controls/communications block 514. Using the command signals, the MFEC 522 can be configured to handle 120 Hz power that is demanded by the grid current while maintaining DC power delivery operation of the PV panel 520 and generating 60 Hz current for the 60 Hz voltage on the grid 550. In one embodiment, the MFEC 522 can be capable of handling any number frequency power demanded by the grid current while generating another frequency or the same frequency current for the voltage on the grid 550. In some instances, the output frequency power to the grid 550 may be the same as, double, triple, or any multiple of the frequency current for the voltage on the grid 550. The MFEC 522 can also adjust the power output of the SM 510 at its maximum power point or an improved power point, assisting with the adjustment.

Each SM 510 can also include a string current equalizer (SCE) 518. The SCE 518 can be configured to ensure that the SMs 510 on the same string can handle an equal amount of AC current in order to avoid any unintentional voltage buildup (e.g., in order to reduce the bandwidth requirement for communication). The SCE 518 can prevent excess current or voltage buildup, thereby assisting in the equalization from one SM 510 to the next on the same string. This can permit current sharing and equalizing between the various SMs 510 of a string. The SCE 518 can also communicate with the MFEC 522 by providing (and/or receiving) commands to the MFEC 522. For example, the SCE 518 can provide commands to the MFEC 522, which can result in or assist with current sharing/equalization for its respective SM 510. In some instances, one-way or two-way communications can be provided between the MFEC 522 and the SCE 518.

According to one or more embodiments, each SM 510 can include a low-pass filter (LPF) 516. The LPF 516 can pass low-frequency signals while attenuating signals with a frequency higher than a cut-off frequency. The amount of attenuation can depend on the application and/or the particular signal. The LPF 516 can also be in communication with the DC-to-AC inverter 512, the SCE 518, and/or a string carrying other SMs 510, and can be configured to communicate with a master controller and/or another LPF 516 of another SM 510 within the string. In some instances, an LPF 516 of a SM 510 can be delegated to be a master LPF 516 (e.g., dynamically), while other LPFs 516 of other SMs 510 on the string are configured to be slave LPFs 516. In one embodiment, the LPF 516 can include passive components (e.g., small passive components) that can reduce cost, weight, volume, and/or increase the power density of the LPF 516.

In some embodiments, the LPF 516 can provide a current to be outputted to the string carrying other SMs 510 and can provide an alternating current from which high frequencies have been attenuated or removed (e.g., the LPF 516 can process and/or modify the current that is outputted from the DC-to-AC inverter 512). The string carrying the various SMs 510 can take the currents provided by the SMs 510 on the string to a load center (e.g., combine the currents provided by the individual SMs 510 on the string to produce a combined output for the string). In some instances, the combined output can pass through the GCF 530 and/or the GDP 540. The currents from the individual SMs 510 can each pass (or one or more of the SMs 510 may pass) through one or more LPFs 516 and/or other types of filters before reaching the string.

Figure 6:
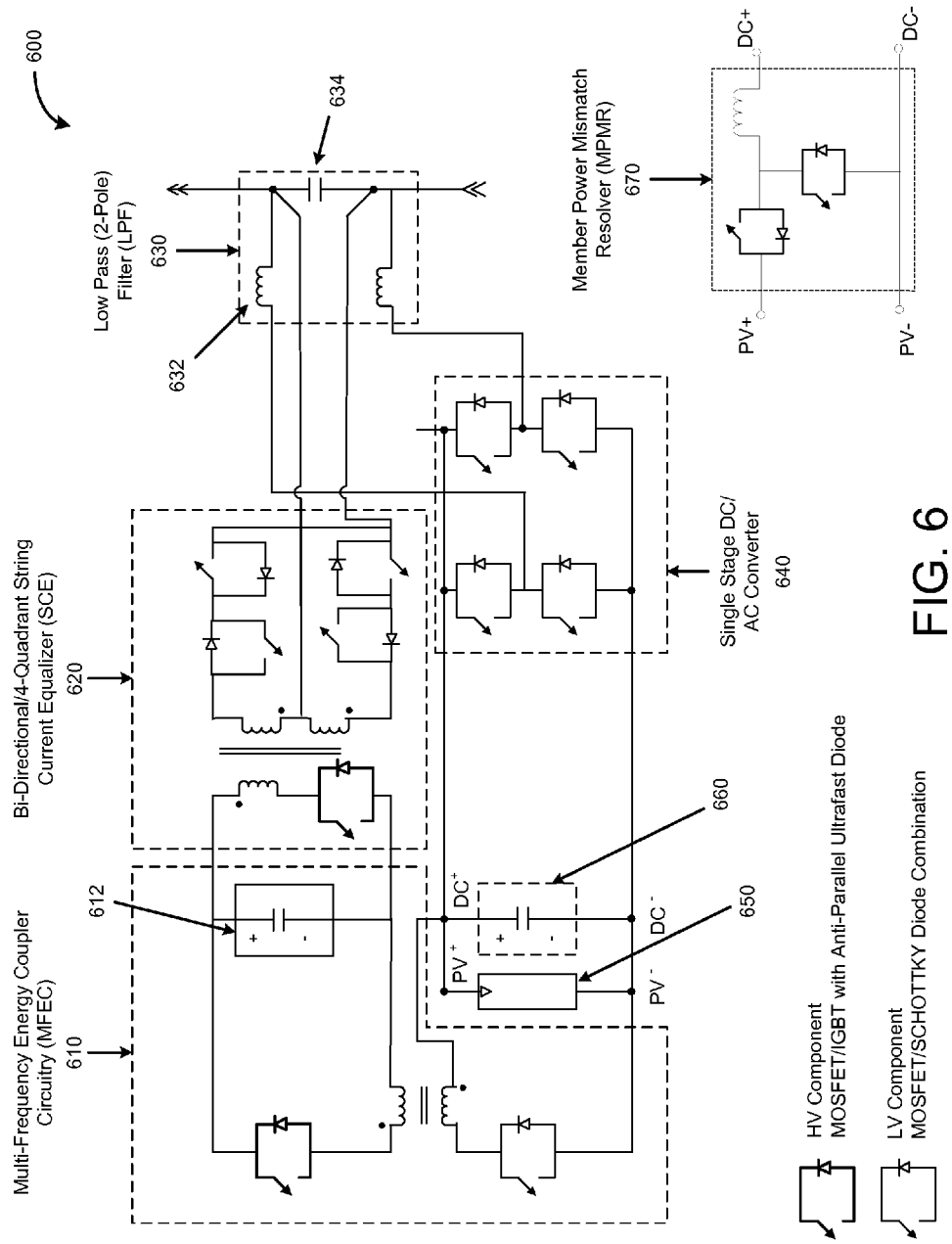
FIG. 6 illustrates a detailed power circuit diagram of a string member as described in FIG. 5, under an embodiment.

FIG. 6 illustrates a detailed diagram of a string member as described in FIG. 5, under an embodiment. For example, a string member 600 can represent a string member as described in FIGS. 1-5. In one embodiment, the string member 600 can include an MFEC 610, an SCE 620, a LPF 630, a DC-to-AC inverter 640 (e.g., a single stage inverter), a PV panel (or other voltage source) 650, and a high frequency switching ripple capacitor 660. The DC-to-AC inverter 640 can be a multiple-stage inverter in other embodiments. The LPF 630 can also include a current shaping inductor (CSI) 632 and a filter capacitor 634. Other components can be provided with the string member 600, but are not illustrated for simplicity purposes.

In some embodiments, the one or more components of the string member 600 can include both high-voltage (HV) and low-voltage (LV) components, as illustrated in FIG. 6. The HV component can comprise a metal-oxide-semiconductor field effect transistor (MOSFET) and/or insulated gate bipolar transistor (IGBT) with an anti-parallel ultrafast diode, while the LV component can comprise a MOSFET and/or Schottky diode combination. Depending on implementations, there can be advantages for using MOSFETS. For example, MOSFETs may permit the reverse flow of current, can be more affordable than IGBTs, and/or can permit faster switching than IGBTs. The use of MOSFETs can be permitted by the low voltages used in the string member 600. Additionally, to further improve the efficiency of conversion, gate drive energy recovery circuits can be employed for the power switches. This gating energy is typically dissipated in conventional IGBT-based centralized inverters and microinverters due to the difficulty (because larger passive components are required) in designing such circuits around slower switching speed semiconductor switches. MOSFET-based implementation of the stage DC-to-AC inverter 640 can also benefit from the utilization of two different types of MOSFETs—one that is optimized for higher switching speeds, and the other that is optimized for low conduction drop. For example, the first type can allow the implementation of the high switching frequency pulse width modulation, while the other type can allow grid frequency commutation provided at a low conduction drop for the reversal in direction of the grid AC currents.

According to embodiment, the MFEC 610 of the string member 600 can include a high voltage energy source 612. For example, in some instances, for every 1 W of PV power, the MFEC 610 can store about 2.65 mJ (if the MFEC 610 is only required to supply the 120 Hz component of the power to the grid and assuming no losses in the circuit). Accordingly, for a commonly utilized solar panel that generates 240 W, the MFEC 610 can have sufficient storage capacity for at least 0.636 J. If additional requirements are imposed on the MFEC 610, as described previously, then the energy storage requirements can be supplemented accordingly.

The SCE 620 can be coupled to the MFEC 610. In some embodiments, the SCE 620 can be implemented with a 2-quadrant/unidirectional converter circuit if energy is only required to be extracted from the AC-side to the high voltage storage 612. In some embodiments, the SCE 620 can be a bi-directional 4-quadrant converter circuit. A bi-directional SCE 620 can be useful in maintaining a 60 Hz voltage waveform across the output of the string member 600 (e.g., the AC cap of the LPF 630). The SCE 620 can provide a low-impedance path for the low frequency (60 Hz) currents if the 60 Hz current through the inductor 632 of the LPF 630 is mismatched with the 60 Hz current of the string. The energy in the mismatched currents may then be retrieved and stored inside the high voltage capacitive storage 612 and then recycled back into the main power-flow circuitry. Additionally, the SCE 620 can be configured to handle very low energy corresponding to a few tenths of an ampere in the LPF current shaping inductor 632.

The LPF 630 of the string member 600 can be a 2-pole filter. In other embodiments, other types of filters can be used in the string member 600. The LPF 630 can include one or more CSI 632. In some embodiments, two or more CSIs 632 can be included within the LPF 630.

According to embodiments, in any installation (e.g., any residential or commercial installation), during the course of a string's operation, the individual SMs can operate at different improved/maximum power points ($P_{mp}$) due to the variation of PV panel performance even within the same batch of PV panels (e.g., one SM can operate at a different $P_{mp}$ than another SM of the same string). Accordingly, the system can be configured to adjust the power output of each SM at its respective $P_{mp}$. In some embodiments, some of the SMs may operate at lower power points, while other SMs can operate at higher power points. In some instances, an SM operating at lower power points may be considered to be a "weaker" SM, while an SM operating at a higher power point may be considered to be a "stronger" SM. Under such circumstances, the weaker SM may need to be able to handle the higher current of the string as demanded by a stronger SM. This may allow the stronger SM to operate at a higher power point while the weaker SM operates at its $P_{mp}$, which is lower in power than that of the stronger SM.

In addition, for a PV panel, the maximum power point or $P_{mp}$ may be defined by a certain $V_{mp}$ and $I_{mp}$, where $V_{mp}$=voltage at max power, and similarly, where $I_{mp}$=current at max power. The PV panel may need to be biased such that it delivers $I_{mp}$ current at $V_{mp}$ voltage. The voltage may be fixed or defined for a particular SM. With a defined $V_{mp}$ at the input to the DC-to-AC inverter 640, the output current (AC) may also be fixed for the same $P_{mp}$ power input.

Thus, a mechanism may be put into place so that the input to the DC-to-AC inverter 640 can be varied (e.g., lowered or stepped-down) compared to $V_{mp}$ and would allow a higher current (e.g., AC) at the output of the SM for the same $P_{mp}$. Preferably, the mechanism may permit the voltage input to be stepped down, or alternatively, the mechanism may permit the voltage input to be stepped up, which may permit a lower current rate. This may be accomplished by a "buck"

converter as shown in FIG. 6. On the other hand, if a step-up operation is required, then a "boost" converter may be employed. For example, the boost or buck circuit can be provided to adjust for PV panel performance variations within a string while the string current is being maintained at a desired level.

A member power mismatch resolver (MPMR) 670, which may be a boost or buck circuit, can be provided in accordance with an embodiment of the energy collection and conversion system. The MPMR 670 can be inserted between points PV+ and DC+ of FIG. 6. Under certain conditions, the MPMR 670 assists in allowing a string controller or master controller to route power from the panels to the grid differentially and based on the capability of higher and lower performing panels. In other embodiments, a DC/AC H-bridge inverter can also be included in the string member 600. The MPMR 670 is a synchronous buck circuit for a high efficiency operation. In alternate embodiments, other boost or buck circuit configurations can be utilized. A circuit that is capable of varying (e.g., reducing or increasing) the input can also be used in the string member 600.

In one embodiment, the MPMR 670 can be configured to be operational only when the string member 600 is operationally weaker than other SMs in the string. Furthermore, when a boost or buck circuit is in operation, the DC-to-AC inverter 640 can operate at its highest efficiency because the DC-to-AC inverter 640 is allowed to operate with a modulation index of close to 1. The AC voltage waveform magnitude may then be modulated by the boost or buck circuit.

Methodology

Figure 7:
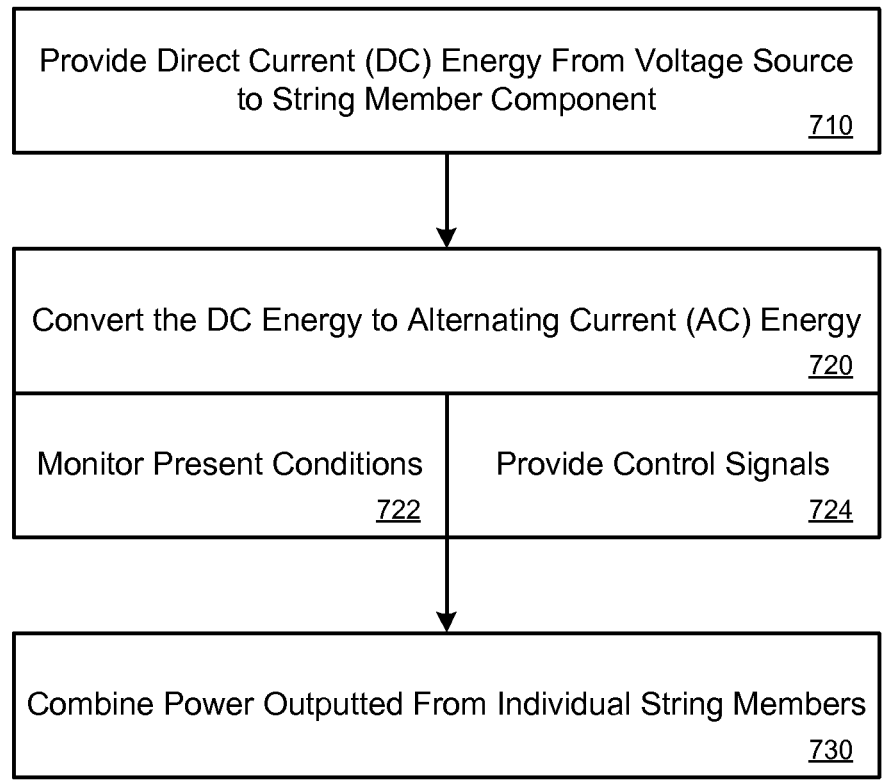
FIG. 7 illustrates an example method for collecting and converting energy, according to an embodiment.

FIG. 7 illustrates an example method for collecting and converting energy, according to an embodiment. A method such as described by an embodiment of FIG. 7 can be implemented using, for example, components described with embodiments of FIGS. 1-6. Accordingly, references made to elements of FIGS. 1-6 are for purposes of illustrating a suitable element or component for performing a step or sub-step being described.

According to an embodiment, the system includes one or more strings that each have a plurality of string members that are coupled to each other in series. For each SM, DC energy is provided from a voltage source of the SM to the string member component of the SM (step 710). In some embodiments, the voltage source can be a PV panel that generates a DC voltage in response to receiving sunlight on the panel. The PV panel can be coupled to a DC-to-AC inverter (or microinverter) so that the DC voltage can be converted into AC voltage. In other embodiments, the PV panel can be first coupled to a DC-to-DC converter, such as a boost or buck circuit, so that the DC voltage can be stepped up or stepped down before being provided to the DC-to-AC inverter.

The DC energy is converted into AC energy by the DC-to-AC inverter (step 720). The DC-to-AC inverter can perform a single-stage conversion; however, in other embodiments, the DC-to-AC inverter can be a multi-stage converter. For each SM, the DC energy can be converted based on present conditions that are monitored by one or more controllers of the system (sub-step 722). Such present conditions can include conditions of the PV panel of a particular SM, the particular SM, the PV panels of other SMs, other SMs on the same string, the string as a whole, the load center the string is coupled to, other strings, and the electrical grid. Depending on these conditions, the one or more controllers can provide control signals (sub-step 724) to various components of each SM in order to control the outputs of individual SMs on a particular string.

The combined output can then be provided to a load center and/or grid interface (step 730). The output can be processed by components of the load center, such as the GCF and/or the GDP. Accordingly, the method enables DC energy at the PV panel level to be converted into AC energy in a single stage conversion, and enables the output from each SM to be combined or consolidated on the string in order to couple to the electrical grid.

Additional System Features

Figure 8:
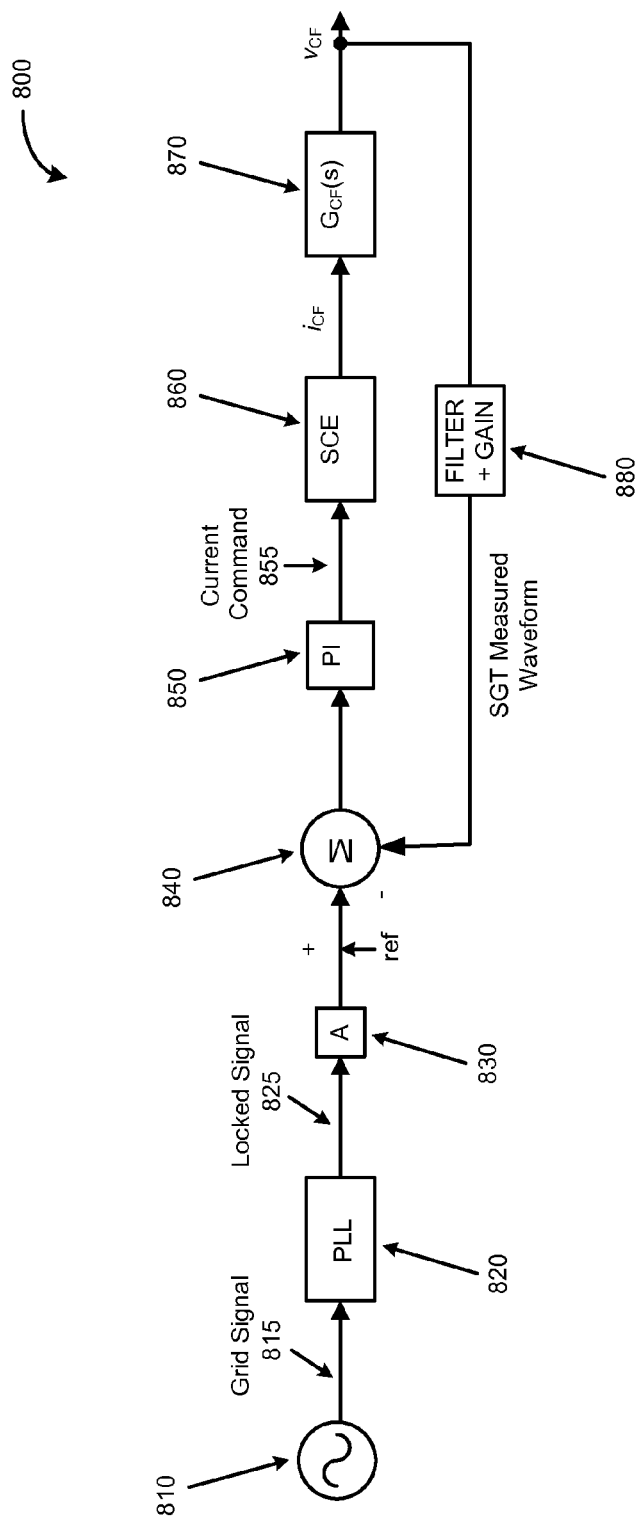
FIG. 8 illustrates an example of a synchronous grid tracker that can be included in an energy collection and conversion system, in one or more embodiments.

FIG. 8 illustrates an example of a synchronous grid tracker that can be included in an energy collection and conversion system, in one or more embodiments. The synchronous grid tracker (SGT) 800 can be included with various embodiments of the energy collection and conversion system of FIGS. 1-7. The SGT 800 can also be implemented using one or more components described with embodiments of FIGS. 1-7. In one embodiment, the SGT 800 can be included within a solar PV energy collection and conversion system. In some instances, however, a SGT 800 may not be required in the system (e.g., if an integrated string power controller (ISPC), as described below, is implemented in the system).

According to embodiments, a synchronous grid tracker can be configured to monitor the conditions (e.g., the voltage, the current, the phase) of an existing electrical grid 810 in which the energy collection system is interfaced with. The SGT 800 can use existing components of the string, string members, and/or load center, such as the string current equalizer (SCE) 860 (such as described in FIGS. 5 and 6, for example), to enable a string member to synchronize with the utility grid 810. Synchronization can be achieved by following a broadcast signal, which contains an actual measured grid voltage or the voltage across a particular string. The broadcast signal can be provided by a communications gateway, which is typically a single point in a solar system installation and is able to monitor the grid voltage waveform. The grid signal 815 can be the broadcast signal or can be derived from at least a portion of the broadcast signal (e.g., averaged at a rapid rate at 120 Hz) based on different embodiments.

The SCE 860 can monitor the voltage across the filter capacitor (CF) of the low-pass filter (LPF) (such as described in FIGS. 5 and 6, for example), and accordingly can inject or extract energy in or out of the capacitor based on the error of the actual measured capacitor voltage with respect to the broadcast signal. An update rate of 600 Hz may be sufficient in containing enough information about the utility grid voltage conditions. In other embodiments, other update rates can be utilized by the SGT 800, having any numerical value, including but not limited to 2400 Hz, 2000 Hz, 1800 Hz, 1500 Hz, 1200 Hz, 900 Hz, or 300 Hz. Depending on grid conditions, it may also be sufficient to broadcast rms voltage, frequency (e.g., updated every 60 Hz or 120 Hz), and/or zero-cross information. Necessary and/or sufficient information about grid conditions can be provided to individual string members. In some instances, the broadcast signal 815 may be received by a SCE 860, LPF, and/or the controls/communications block (see FIGS. 5 and 6).

In some embodiments, the phase information for the reference waveform necessary to track the grid 810 can be synthesized by a phase locked loop (PLL) 820 that can update the reference waveform for the SGT 800 with respect to changes in the grid frequency/phase information that is contained in the broadcasted monitored signal 815 (e.g., 600 Hz broadcasted signal). A locked signal 825 can be provided from the PLL 820 to an amplitude scaling factor (A) 830. According to an embodiment, the amplitude scaling factor can be based on the grid signal 810 and averaged at a particular frequency (e.g., at 60 Hz or 120 Hz). The signal can then be provided to a proportional-integral (PI) controller 850. Alternatively, other controllers (e.g., a proportional-integral-derivative (PID) controller, a PD controller, a P controller, or an I controller) can be used in other embodiments. The current 855 is provided to the SCE 860, which can assist the string member to synchronize with the grid 810 and/or achieve current equalization. The current ($i_{CF}$) can then pass to the $G_{CF}(s)$ block 870, the transfer function of the filter capacitor whose output is the capacitor voltage, $v_{CF}$. A voltage measurement $v_{CF}$ can be fed back through the feedback loop and added (via the summation operation 840). In some embodiments, fed back signal can be processed by the filter and gain block 880 (e.g., undergo filtering and/or gain) in instances where the $v_{CF}$ is to match the grid voltage.

The SCE 860 can be configured to perform at least two separate functionalities of (1) equalizing the string current, and (2) simultaneously tracking the grid voltage. The SCE 860 can do this by monitoring a single parameter, or one or more parameters. In some embodiments, the parameter can be the voltage, $v_{CF}$, of the LPF capacitor, $C_F$. This voltage can be artificially maintained in synchronicity with the grid voltage to create a situation of a minor grid for each string member to view into. In one embodiment, the SGT 800 significantly simplifies the inter-member communication and string control mechanism for balancing the current, voltage and ultimately power.

Figure 9A:
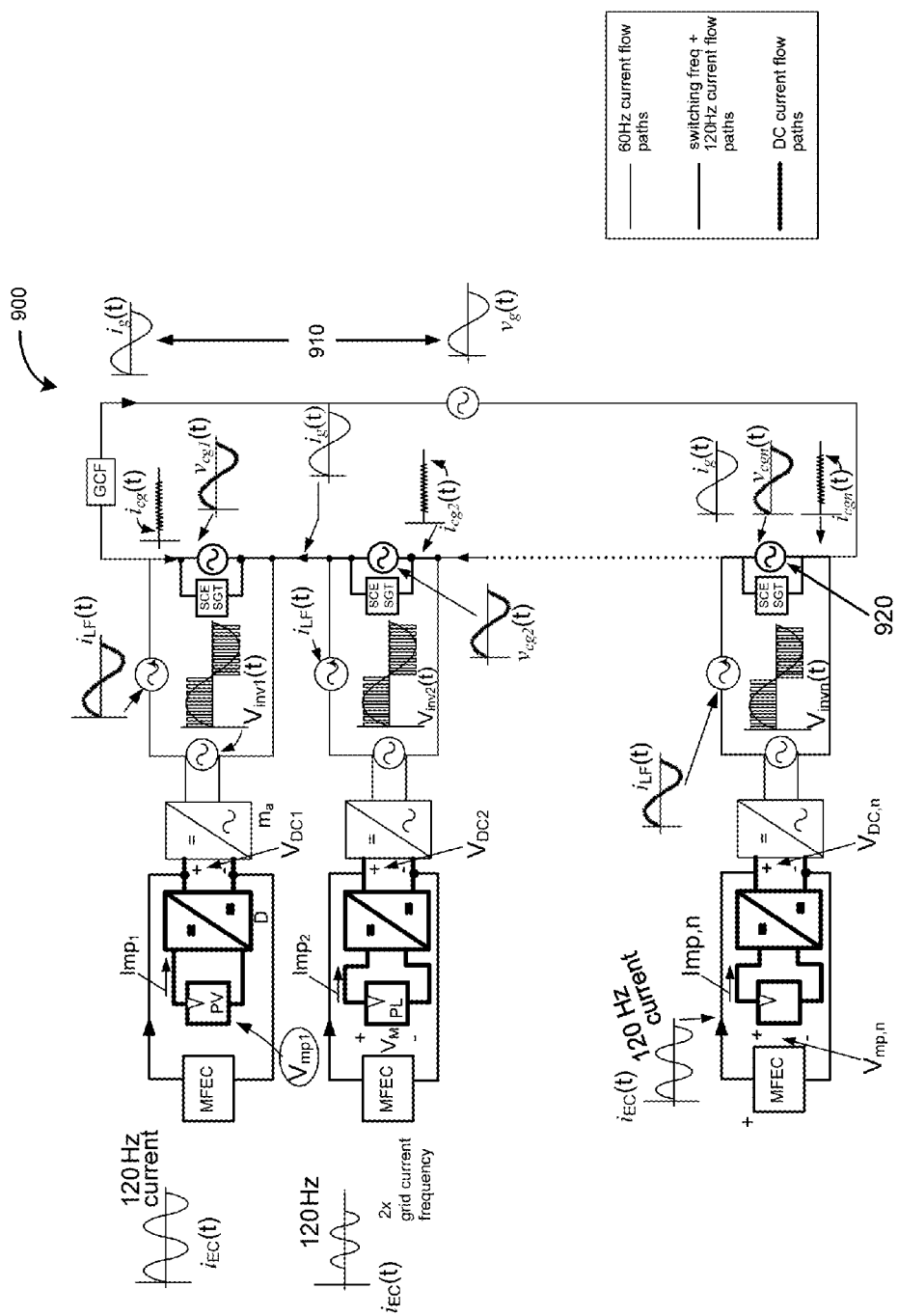
FIGS. 9A-9B illustrate power flow representations of an energy collection and conversion system, according to embodiments.
Figure 9B:
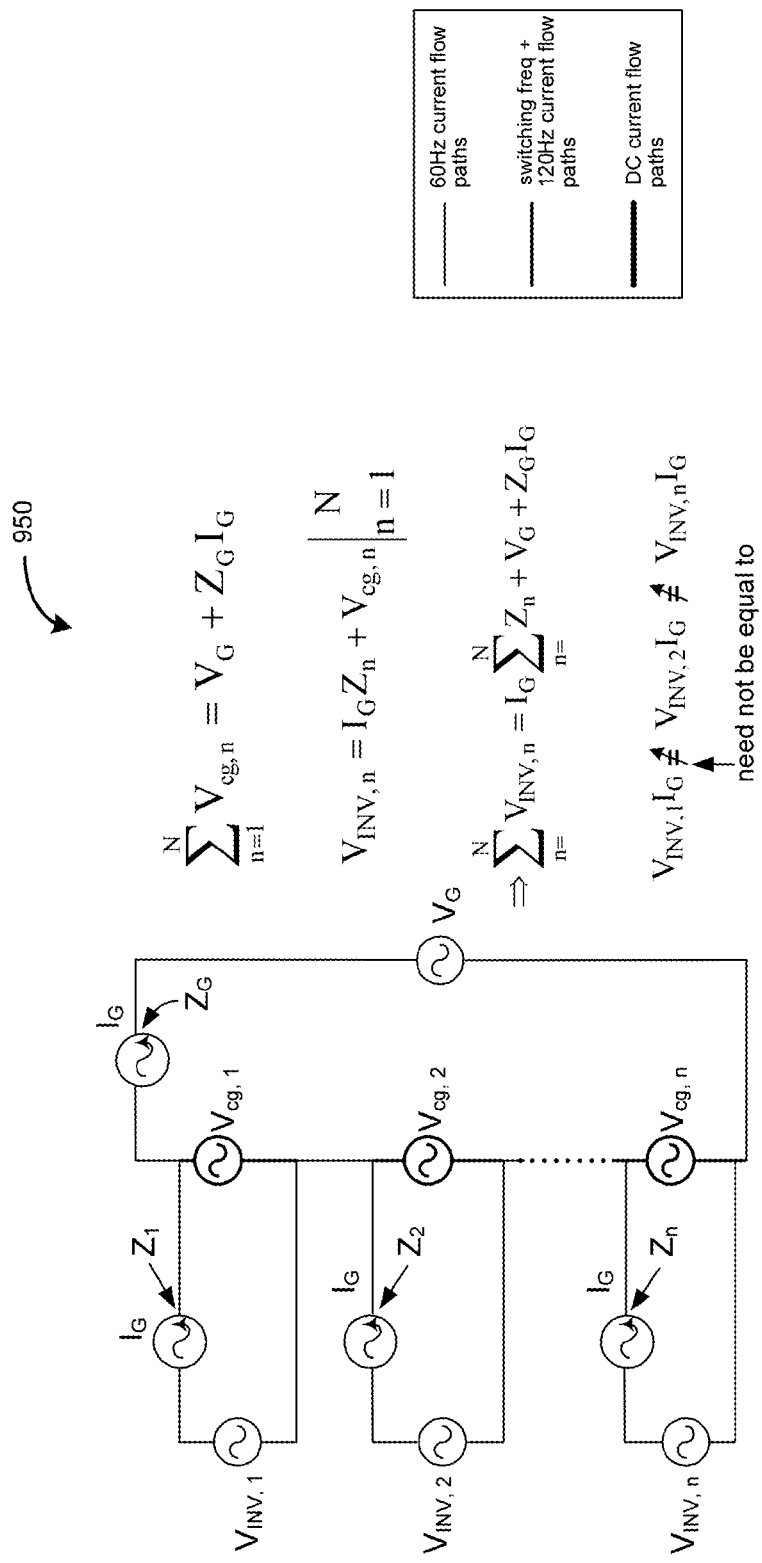

FIGS. 9A-9B illustrate power flow representations of an energy collection and conversion system, according to embodiments. The representations illustrate the power flow at various frequencies of the energy collection system, as described in various embodiments.

FIG. 9A illustrates a power flow representation of various frequencies. A legend is provided that illustrate which lines of the power flow representation 900 correspond to (1) 60 Hz current flow paths, (2) switching frequency and 120 Hz current flow paths, and (3) DC current flow paths. In the embodiment described, multiple SMs are provided, with each SM including a PV panel, a DC/DC converter (boost or buck circuit), an MFEC, an inverter, an SCE, and an SGT. Each of the string members provides an individual AC output (e.g., $v_{cg1}$, $v_{cg2}$). The combined output of the string members (e.g., the output of the string) can be provided to the GCF.

The representation 900 illustrates quantities that remain the same or substantially similar amongst the members. For example, the 60 Hz content of $i_{LF}(t)$, $i_{EC}(t)$ are identical, and $i_g(t)$ remains the same from SM to SM and to the grid. The representation 900 also illustrates the unity power factor 910, and a high impedance path 920 for a 60 Hz current.

FIG. 9B illustrates a simplified power flow representation with only 60 Hz current and voltages. Like FIG. 9A, a legend is provided that illustrate which lines of the power flow representation 950 correspond to (1) 60 Hz current flow paths, (2) switching frequency and 120 Hz current flow paths, and (3) DC current flow paths.

Figure 10:
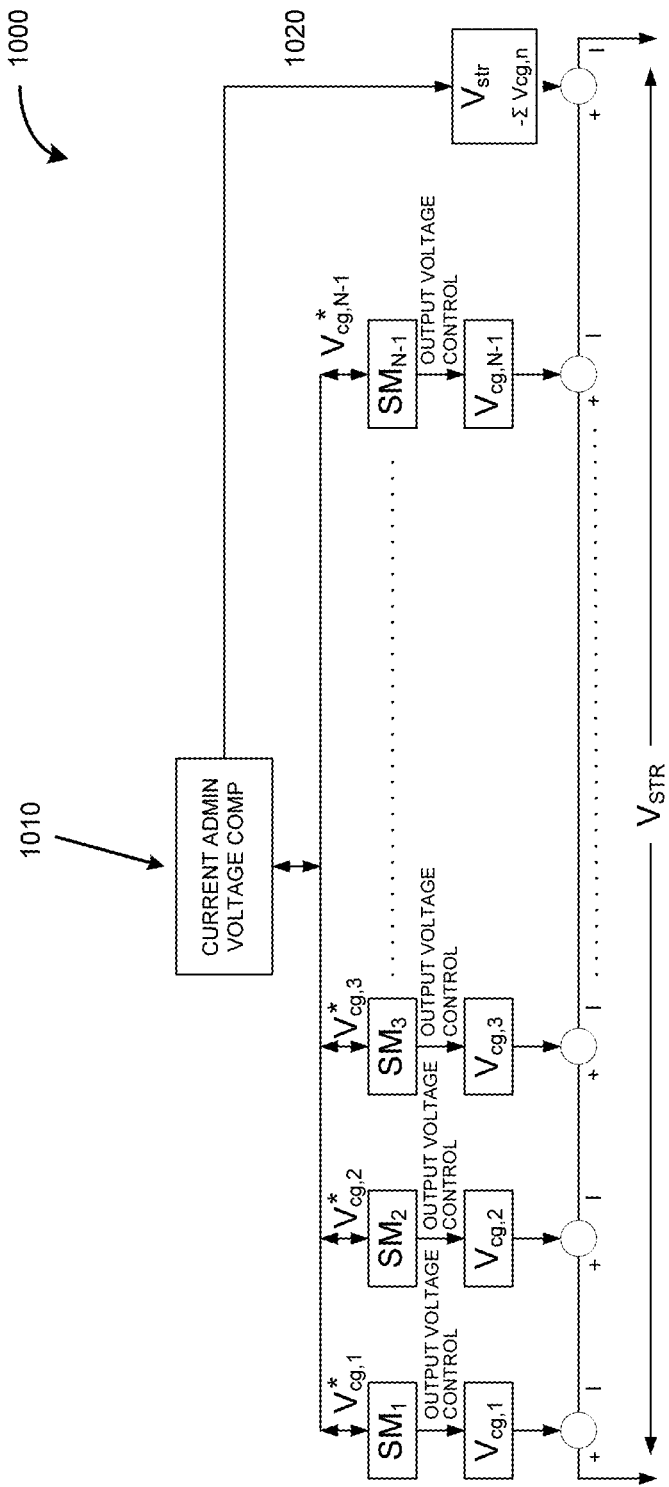
FIG. 10 illustrates a power controller, under an embodiment.

FIG. 10 illustrates a power controller for an energy collection system, under an embodiment. For describing some portions of the application, the following nomenclature is provided. Such nomenclature is provided by way of example only and is not limiting. Nomenclature for the string building blocks can include the following:

String member, or member, or SM: The SM includes a voltage source, such as a PV panel, and conversion components, such as DC-to-AC inverter, SCE, SGT, MFEC, MPMR blocks.

Current administrator (CA): This is a function that can be dynamically assigned to a string member on a string based on the string members' ranking on a scale of strength (SOS). The SOS can be determined as follows—the lowest PV voltage for the same grid current=lowest rank on SOS; the highest PV voltage for the same grid current=highest rank on SOS. The lowest ranked member at any given time can be determined to be the string CA until it reaches its maximum power point (MPP) and transfers its administrative function to the next lowest ranked member.

Voltage compensator (VC): This is also a function that can be dynamically assigned to a string member on a string based on the string members' ranking on a SOS. The highest ranked SOS member can be assigned the task of fulfilling the gap in voltage of the string in relation to the electrical grid. The gap in voltage can be determined by using two grid couplers (defined below) after comparing the grid voltage to the summation of the member output ac voltages, $v_{cg}$, as shown in FIG. 9B. In different embodiments, both the CA and the VC functionalities can be consolidated and handled by a single SM, or can be handled by multiple SMs.

Grid coupler (GC): There can be two grid couplers per string tying each side of the string to each terminal of the grid (e.g., via a load center and/or grid interface). The couplers can measure the common-mode voltage of each grid terminal with respect to a known common reference point, such as the earth ground. The couplers may or may not broadcast the common-mode voltage and/or communicate the common-mode voltage to other components. In some embodiments, the voltage different that is measured by the two GCs can be representative (in magnitude and/or phase) of the grid voltage waveform when the string is "idling," a condition when the string is connected to the grid but is not exporting power.

Referring back to FIG. 10, the power controller 1000 can be provided for an energy collection and conversion system, as described in embodiments of FIGS. 1-9B. The power controller 1000 can be an integrated string power controller (ISPC). In some embodiments where the system includes an ISPC power controller 1000, a SCE and/or SGT may not be necessary. Alternatively, an ISPC can be provided in the system with an SCE and/or SGT.

In one embodiment, the power controller 1000 can include a current administrator voltage compensator (CAVC) 1010. The CAVC 1010 can perform the functionalities of the CA and the VC as discussed above, and in some embodiments, can be performed by a power controller instead of being performed by an individual string member based on the SOS rankings. The CAVC 1010 can be in communication with one or more string member ($SM_1$, $SM_2$, $SM_3$, . . . $SM_{N-1}$) and can receive voltage and/or current information for each of the string members. In some instances, the CAVC 1010 can send one or more command to each of the string members. For example, an output voltage control can be provided to each of the string members. The CAVC 1010 can be configured to output a current control 1020 to an overall string voltage (e.g., $V_{STR}$).

Figure 11:
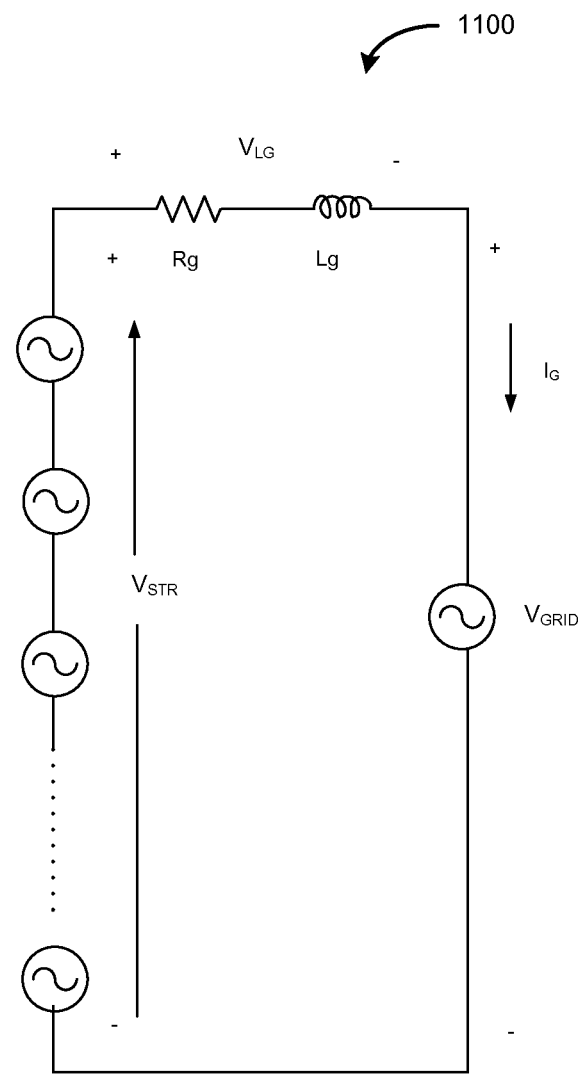
FIG. 11 illustrates a simplified example of an energy collection and conversion system, according to an embodiment.

FIG. 11 illustrates a simplified example of an energy collection and conversion system, according to an embodiment. A high-level depiction of the current and voltage within the energy collection and conversion system 1100 can be seen in the example provided in FIG. 11. In some embodiments, the voltage of the string, $V_{STR}$ can be provided as a sum of the individual voltages that are provided from each string member of the string. As discussed, each string member can yield an AC voltage. A voltage can be provided to the grid, which has a voltage $V_{GRID}$, with a corresponding current, $I_G$. A voltage for the stray inductance of the PV panel layout and the inductance in the Grid Connection Filter (GCF) (for example, the GCF as discussed with respect to FIG. 5), which is represented as $V_{LG}$, can also be provided in the system.

Figure 12:
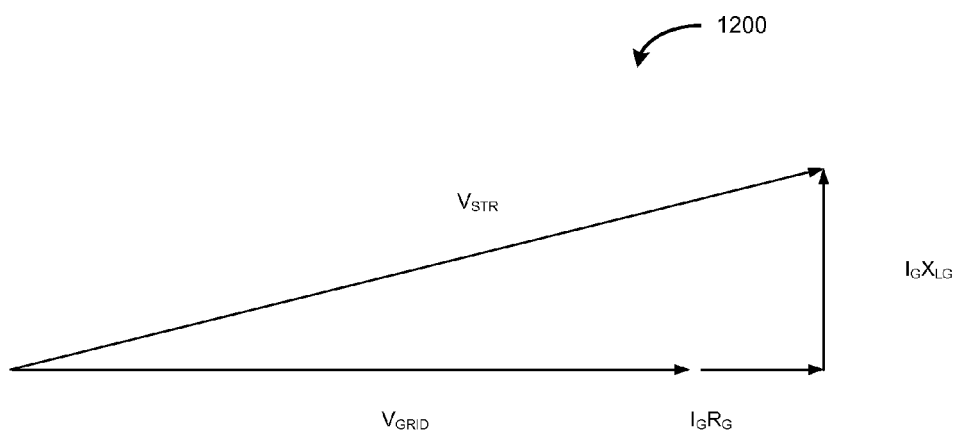
FIG. 12 illustrates a phasor diagram showing a string voltage in relation to the grid voltage, under an embodiment.

FIG. 12 illustrates a phasor diagram showing a string voltage in relation to the grid voltage, under an embodiment. The phasor diagram 1200 shows $V_{STR}$ in relation to the grid voltage and the impedance drop due to the wiring and inductor(s) inside the grid connection filter (GCF) for unity power factor operation, such as when the current and the voltage are in phase and frequency synchronism. As illustrated in FIG. 12, the voltage for the string can integrate the voltage demand by the grid, the resistive voltage drop and the inductive voltage drop due to inductances in the circuit. In general terms, the string voltage can compensate for the grid voltage and any other resistive and reactive voltage drops in the circuit.

As illustrated in the phasor diagram 1200, the synthesized $V_{STR}$ can balance both the active and reactive components of the voltage waveform. Upon connection of the string to the electrical grid (e.g., via one of many different means an electromechanical relay, electronically controlled contactor, or other such means), a logical voltage command for each member is as follows:

$$V_{cg,k}^* = \frac{1}{(N-1)}[V_{GRID} - V_{CAVC}^{est}] \quad \text{(Eqn. 1)}$$

where $V_{cg,k}^*$ is the output voltage reference/command for each of the (N−1) members other than the "administrator" or the CAVC member. Based on its PV panel's output capability, the CAVC can estimate the amount of AC-side voltage it would be able to synthesize and compensate based on a given grid current. As a starting point, the rms current quantity may be only a few fraction of amperes. However, the CAVC can choose to support and compensate for the string voltage $V_{STR}$ up to a few amperes. In doing so, the CAVC's output voltage can reflect an equal portion of the grid voltage, $$\left(\frac{1}{N}\right)V_{GRID},$$

in addition to the impedance loss associated with the grid-connectivity. Mathematically, this may be represented, in phasor quantities, as $$\vec{V}_{CAVC}^{est} = \frac{1}{N}\vec{V}_{GRID} + \vec{I}_G R_{LG} + j\vec{I}_G X_{LG} \quad \text{(Eqn. 2)}$$

In reality, the required $R_G$ and $X_{LG}$ can be very small due to the high switching frequencies enabled by this invention. Examples of high switching may include upwards of 200 kHz, or any other value, such as 100 kHz, 300 kHz, 500 kHz, 700 kHz, or 1 MHz. However, this excess active and reactive voltage components may still have to be compensated by the CAVC.

It should also be noted here that $V_{CAVC}^{est}$ is only an estimate that is calculated based on the CAVC's panel quality. The CAVC, in reality, can operate in current control mode, in one embodiment, while the other members are in voltage control mode. The CAVC can be configured to administer the desired current through the string as it can satisfy Equation 2 above as the other members are able to contribute their share of the voltage necessary for maintaining the $V_{STR}$, the string voltage for a given grid current.

In some embodiments, reactive power sharing can also be performed by the energy collection and conversion system. The active power generated by the CAVC may be estimated from its input DC quantities, namely the voltage, $V_{DC}$, and current, $I_{DC}$. For a lossless member component, $$V_{DC}I_{DC} = \frac{1}{2}\left(\frac{\hat{V}_{GRID}}{N}\hat{I}_G\right) + I_G^{rms}R_G I_G^{rms} \quad \text{(Eqn. 3)}$$

where $\hat{V}_{GRID}$ is the peak of the grid voltage sinusoidal waveform and similarly, $\hat{I}_G$ is the peak of the grid current sinusoidal waveform. The apparent power handled by the CAVC, $S_{CAVC}$, may be calculated by measuring the rms voltage, $V_{CAVC}^{rms}$, and current, $I_G^{rms}$, quantities such that $S_{CAVC} = V_{CAVC}^{rms} I_G^{rms}$, $$\frac{1}{2}I_G^{rms^2}X_{LG} = |S_{CAVC}| - V_{DC}I_{DC} \quad \text{(Eqn. 4)}$$

In other words, the reactive component of the voltage waveform can be calculated based on measured quantities. In addition, the lossy part of the grid-tie component, $R_G$ may be estimated or calculated from Equation 3 by substituting for the measured $V_{DC}$, $I_{DC}$, and $\hat{V}_{GRID}$ and the command $\hat{I}_G$.

Once $R_G$ and $X_{LG}$ have been calculated the voltage commands to the other string members (SMs) may now be updated as follows:

$$\vec{V}_{cg,k}^* = \frac{1}{N}[\vec{V}_{GRID} + \vec{I}_G^* R_G + j\vec{I}_G^* X_{LG}] \quad \text{(Eqn. 5)}$$

where $\vec{I}_G^*$ is the reference grid current. Equation 5 demonstrates that the output voltage references may be accurately calculated from the measured quantities and as measured by the CAVC without the need for extensive communications.

Figure 13:
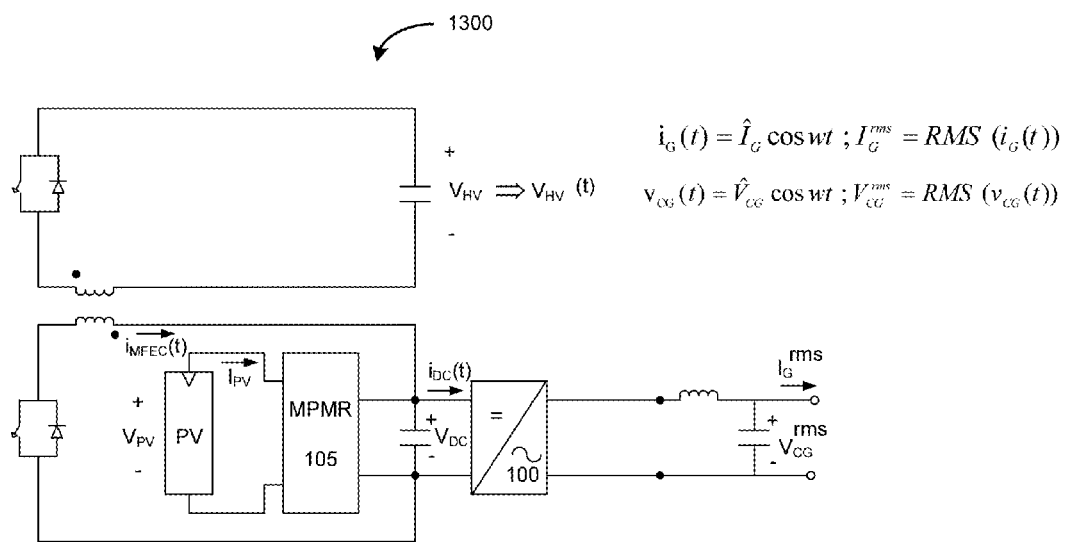
FIG. 13 illustrates an example of a multi-frequency energy coupler circuit for use in an energy collection and conversion system, according to embodiments.

In one embodiment, a power balancing mechanism can also be provided. The power balancing mechanism can be performed for individual string members, and/or for an entire string, and/or for the system as a whole. In order to understand the interaction mechanism between each string member and the CAVC of the string with respect to DC and AC power balancing, a description of the operation of a multi-frequency energy coupling (MFEC) block is provided. FIG. 13 illustrates an example of a multi-frequency energy coupler circuit for use in an energy collection and conversion system, according to embodiments. The MFEC can be used for performing the power balancing operation for the system.

In some embodiments, the MFEC 1300 illustrated in FIG. 13 can correspond to the MFEC as discussed with respect to FIGS. 5-6. The quantities represented in FIG. 13 may be either rms or DC quantities under steady-state operation. For clarity and to demonstrate the 60 Hz and 120 Hz power handling, the instantaneous quantities of the current through the MFEC inductor/transformer, $i_{MFEC}(t)$, and $i_{DC}(t)$ (current into the DC/AC block) may be discussed further.

Figure 14:
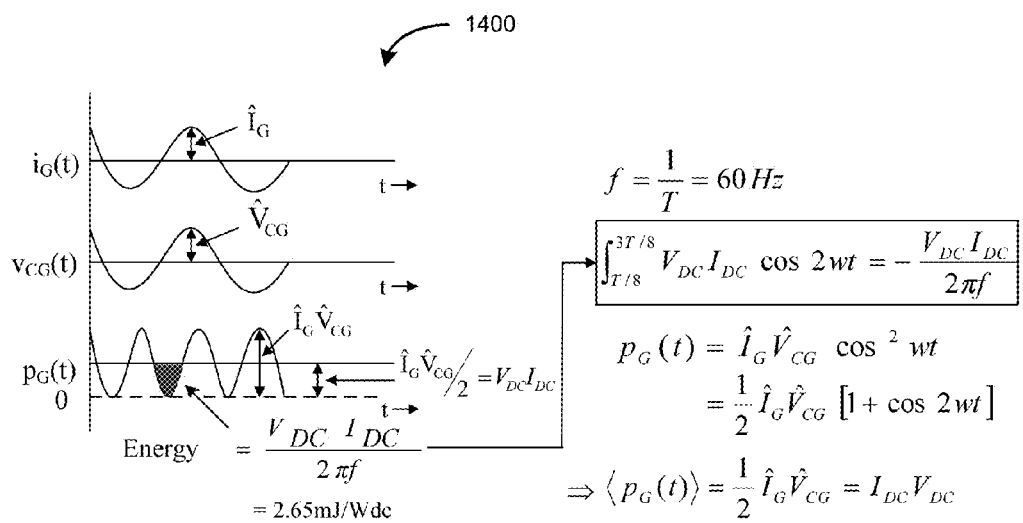
FIG. 14 illustrates a balanced DC and AC power operation, according to an embodiment.

FIG. 14 illustrates a balanced DC and AC power operation, according to an embodiment. Graph 1400 illustrates current, voltage, and power relative to time. With reference to FIGS. 13 and 14, and from the equations provided with FIG. 14, $$P_G(t) = V_{DC}I_{DC}[1+\cos 2wt] = V_{DC}[I_{DC}+I_{DC}\cos 2wt] \quad \text{(Eqn. 6)}$$

$I_{DC}$ is supplied by the PV module via the MPMR and $I_{DC}\cos 2wt$ is supplied or extracted by the MFEC circuitry. As a result, DC/60 Hz AC/120 Hz AC power and the field quantity balance can be maintained within one member without the need for any low voltage capacitive storage requirement. The benefits of the MFEC 1300 can include allowing a much smaller capacitor to be used as the storage element due to the higher voltage level of energy storage, and/or eliminating the need for lower reliability electrolytic capacitors. Another benefit of the MFEC is that the bulk of the energy obtained from the PV Panel does not require the typically lossy voltage step-up operation.

A fraction of source or PV energy delivered to the grid may be without any step-up operation:

$$= \frac{(V_{DC}I_{DC})\frac{T}{4} + (V_{DC}I_{DC})\frac{T}{4} - \frac{V_{DC}I_{DC}}{2\pi f}}{(V_{DC}I_{DC})\frac{T}{2}} = 1 - \frac{1}{\pi} = 68.2\% \quad \text{(Eqn. 7)}$$

In some embodiments, this can be a significant advantage over conventional microinverter topologies where 100% of the source or PV energy needs to be stepped-up before converting to grid compatible voltage. This feature allows for less aggressive heat dissipation designs allowing for reduction in cost while maintaining a higher efficiency of power conversion.

Figure 15:
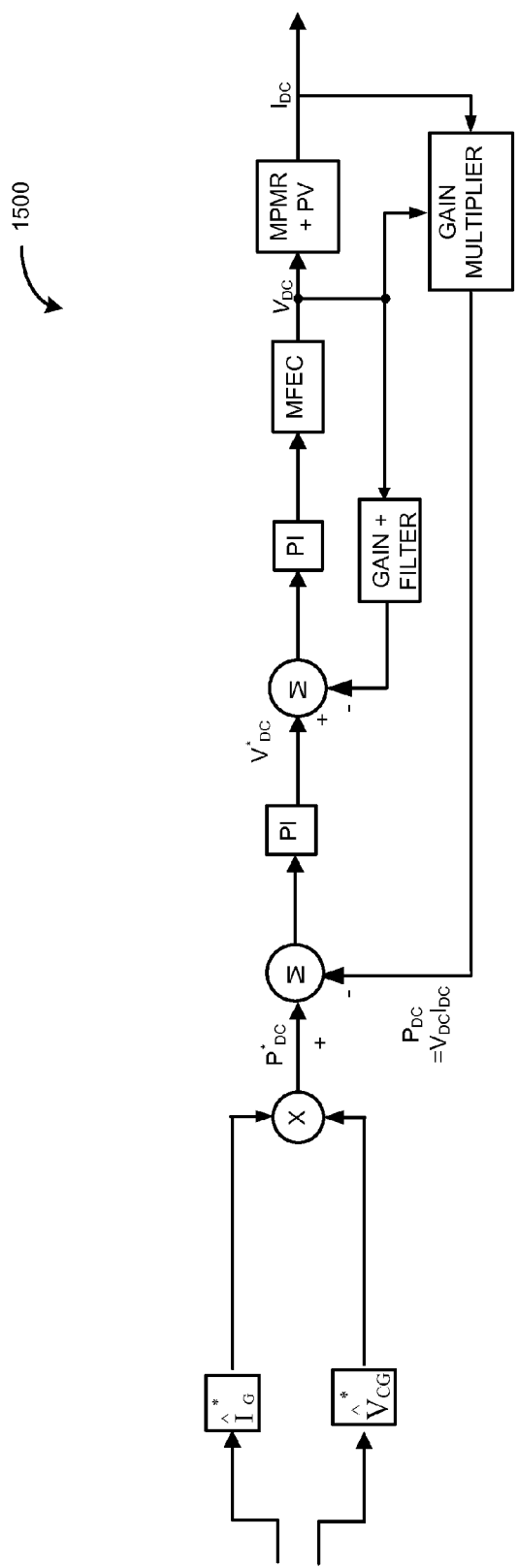
FIG. 15 illustrates a power balancing configuration, under an embodiment.

FIG. 15 illustrates a power balancing configuration, under an embodiment. The power balancing configuration 1500 can be used with respect to the energy collection systems described with respect to FIGS. 1-14. In some cases, it can be beneficial to have power balancing between string demands and individual string member outputs. In one embodiment, demands to raise/increase string power output can always be initiated and controlled by the CAVC. Alternatively, the demand can be initiated by the CAVC at certain times, and not initiated by the CAVC at other times. Internally, string members can adjust their respective MFEC regulator to set a desired $V_{DC}$ that allows the required power flow from the PV panel into the low-voltage DC-bus via the MPMR.

In reality, the instantaneous DC power can be measured by the change in HV DC storage voltage level and the duty cycle of the MFEC switches can be adjusted to maintain a $V^*_{DC}$ such that the commanded AC power need can be satisfied by the DC quantities. In some embodiments, in case of a sudden drop in input PV/DC power, the change in power can be detected via the HVDC storage voltage change and can be communicated to the CAVC in terms of reduction in output voltage, $\Delta\hat{v}_{CG}$, in order to maintain the same string current. The CAVC can then assign the required $\Delta\hat{v}_{CG}$ to another member who may be capable of handling the additional output voltage support. If no capable member is available to handle the additional increase in output voltage demand, then the CAVC can reduce the grid current, $\hat{I}_G$ command to adjust the string to the new reduced power level.

When the MFEC decides to reduce the $V^*_{DC}$ below $V_{MP}$, voltage at an increased or maximum power point, of the PV panel the MPMR regulator operates in the buck, voltage step-down mode, such that the $V_{PV}$ can be maintained at $V_{MP}$ to ensure maximum power point biasing of the PV panel while meeting the needs to the AC power delivery capability of the source.

Accordingly, various embodiments of the energy collection system are provided with respect to FIGS. 1-15. In some embodiments, each string member can be coordinated in a manner to contribute instantaneous power and overall energy based on desired performance or operation profile of each member, each member is coordinated in a manner to produce a desired voltage or current or active power or reactive power output, and/or the combined string output is controlled by a string controller resident internally to one or more members or located externally to the string. In another embodiment, the string can be configured to generate an output even with partial or complete cessation of operation of one or more members of the string, and one or more failed or partially failed members are allowed to be completely circumvented by a circuit bypass mechanism(s) so that operation of the remainder of the string is unhindered, or alternatively, one or more failed or partially failed members are not allowed to be circumvented by circuit bypass mechanism(s), thus requiring cessation of operation of the entire of the string.

In one embodiment, a string controller synthesizes the string output voltage by aggregating the output terminal voltages of the members of the string, or alternatively, the string controller synthesizes the string output voltage by coordinating the output voltage and/or current and/or power of each member in the string. In another alternative, the string controller synthesizes the string output current by coordinating the output voltage and/or current and/or power of each member in the string, or the string controller synthesizes the string output power (active or reactive) by coordinating the output voltage and/or current and/or power of each member in the string.

In another embodiment, one or more strings in parallel may be arranged together electrically to form a single phase (1-phase) voltage output and maybe directly connected to a single phase ac grid or loading system, where three (3) single phase strings or three (3) sets of multiple electrically parallel single phase strings are grouped together electrically for conventional 3-phase electrical power system requirements. Multiple 3-phase groups may or may not be combined in an electrical panel for connecting to the ac electrical grid. In other embodiments, multiple single phase strings or multiple sets of multiple electrically parallel single phase strings can be grouped together electrically for poly-phase electrical power system requirements. The multiple poly-phase groups may or may not be combined in an electrical panel for connecting to the ac electrical grid. The terminals of each string can be connected directly to the ac grid or load system or through an over-current protection device.

The string operation can include operations performed by a current administrator. In one embodiment, no more than one of the members can be the current administrator that is allowed to regulate the string current in a manner so as to achieve maximum or optimal power generation or storage by the string. All other members can regulate their individual output voltages either in coordination by the current administrator or individually based on their independent ability to handle the string current. The aggregation of the member voltages can produce the string voltage in its entirety and the string current is determined by the total available string power.

Alternatively, the string operation can include all members of the string being commanded to generate a certain current by a main current administrator. All members can be equipped with bi-directional energy balancing circuitry that is capable of managing current and capable of energy injection and/or retrieval in order to mitigate current mismatch among members of the string. Energy imbalance due to mismatch in member output current can be retrieved from an energy storage capacitor or injected into the energy storage capacitor. The aggregation of the member voltages can produce the string voltage in its entirety and the string current is determined by the total available string power.

The system can also cause members to be coordinated so as to deliver or store an optimal amount of real or active power and/or energy determined by the string controller, deliver or store an optimal amount of imaginary or reactive power and/or energy determined by the string controller, and/or deliver or store a desired combination of active and reactive power and/or energy determined by the string controller.

The member can further comprise a voltage magnitude and/or phase adjustor comprising a step-up stage or step-down stage for the string controller to differentially manage the energy generation or storage element of the string member in relation to one or more such elements in one or more other string members of the string. In another embodiment, the member can further comprise a power equalizing circuit or converter that balances the instantaneous AC power demand of the output into the AC grid or load with the DC power being drawn from the DC energy collection system. The member can also include a capacitor or capacitor bank connected across the dc generation system that achieves power equalization and balances the instantaneous ac power demand of the output into the ac grid or load with the dc power being drawn from the dc energy collection system.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A circuit for an energy collection system comprising:
   a string to couple to an electrical load, wherein the string comprises:
      a plurality of string members coupled to each other in series,
         wherein each string member of the string comprises
            (i) a connection to receive an output from an energy output device, (ii) an inverter configured to convert the output of the energy output device into an individual alternating current (AC) energy output, (iii) a control circuit configured to control one or more operations of the respective string member, and (iv) a voltage compensator,
         wherein one string member is a current administrator voltage compensator (CAVC), wherein the CAVC is configured to synthesize current and compensate string voltage to be adequately and sufficiently compatible with that of the load,
         wherein CAVC functionality is assigned to the string member based on a relative scale of strength (SoS) ranking of the plurality of string members based on at least one of input voltage and input power of each string member,
         wherein the CAVC controls and regulates string current and each of the other members of the string contributes a respective output voltage to the string commensurate with the input power of the respective string member,
         wherein the CAVC operates in a current control mode to administer the desired current through the string that is adjusted to achieve a predetermined optimal energy contribution to the string and generate a compensating output voltage that is a difference of the load voltage and a summation of voltages of the string members besides the CAVC,
         wherein the voltage compensator of each of the string members besides the CAVC adjusts a voltage of that string member to achieve the predetermined optimal energy contribution to the string,
         wherein the string produces a cumulative AC energy output that is provided to the electrical load.

2. The circuit of claim 1, wherein the CAVC synthesizes current and compensates string voltage to be adequately and sufficiently compatible with that of the load by:
   adjusting, by the CAVC, a voltage of the CAVC to compensate for a change in the load voltage or a change in a voltage of the string;
   in response to the adjusting of the voltage of the CAVC, administering, by the CAVC, a desired current through the string to cause the voltage compensator of each of the string members besides the CAVC to adjust a respective voltage of the string member to equilibrate its respective energy and voltage with that of the load and wherein each of the string members besides the CAVC operates in a voltage control mode.

3. The circuit of claim 1, wherein the electrical load further comprises a grid interface to couple the energy collection system to an electrical grid.

4. The circuit of claim 3, wherein a communications gateway is coupled to the string and to the electrical grid, the communications gateway being configured to broadcast a synchronization signal to each string member of the plurality of string members to enable each string member of the plurality of string members to operate using at least one of:
   a phase that is synchronous with a phase of the electrical grid, or
   a frequency that is synchronous with a frequency of the electrical grid.

5. The circuit of claim 3, further comprising:
   a controller coupled to one or more grid disconnect switches, wherein the one or more grid disconnect switches are controlled by the controller and wherein the controller is configured to cause the one or more grid disconnect switches to change states during faulty conditions.

6. The circuit of claim 3, wherein the individual AC energy output that is converted by the inverter of each of the plurality of string members has at least one of (i) an AC voltage output whose magnitude is based on at least one of a voltage or current magnitude or a power or energy sourcing and sinking capability of an input energy source or storage of the respective string member, (ii) a phase output that is based on a phase of the electrical grid, or (iii) a frequency output that is based on a frequency of the electrical grid.

7. The circuit of claim 3, wherein each of the plurality of string members further comprises a power balancing circuit configured to balance the output provided by an energy output device with the individual AC energy output that is to be delivered to the electrical grid.

8. A circuit for an energy collection system comprising:
a string to couple to an electrical load, wherein the string comprises:
a plurality of string members coupled to each other in series; wherein each string member of the string comprises (i) a connection to receive an output from an energy output device, (ii) an inverter configured to convert the output of the energy output device into an individual alternating current (AC) energy output, (iii) a control circuit configured to control one or more operations of the respective string member, and (iv) a current administrator (CA),
wherein one string member is a current administrator voltage compensator (CAVC),
wherein CAVC functionality is assigned to the string member based on a relative scale of strength (SoS) ranking of the plurality of string members based on at least one of input voltage and input power of each string member,
wherein the CAVC controls and regulates string current and each of the other members of the string contributes a respective output voltage to the string commensurate with the input power of the respective string member,
wherein all of the current administrators have a same current,
wherein each CA controls its current to adjust its respective output voltage based on the output of an energy output device,
wherein each of the plurality of current administrators further comprises a current equalizing circuit configured to handle a mismatch of current between adjacent current administrators,
wherein each of the plurality of current administrators synthesizes current and compensates string voltage to be adequately and sufficiently compatible with that of the load.

9. The circuit of claim 8, wherein the electrical load further comprises a grid interface to couple the energy collection system to an electrical grid.

10. The circuit of claim 9, wherein a communications gateway is coupled to the string and to the electrical grid, the communications gateway being configured to broadcast a synchronization signal to each string member of the plurality of string members to enable each string member of the plurality of string members to operate using at least one of:
a phase that is synchronous with a phase of the electrical grid, or
a frequency that is synchronous with a frequency of the electrical grid.

11. The circuit of claim 9, further comprising:
a controller coupled to one or more grid disconnect switches, wherein the one or more grid disconnect switches are controlled by the controller and wherein the controller is configured to cause the one or more grid disconnect switches to change states during faulty conditions.

12. The circuit of claim 9, wherein the individual AC energy output that is converted by the inverter of each of the plurality of string members has at least one of (i) an AC voltage output whose magnitude is based on at least one of a voltage or current magnitude or a power or energy sourcing and sinking capability of an input energy source or storage of the respective string member, (ii) a phase output that is based on a phase of the electrical grid, or (iii) a frequency output that is based on a frequency of the electrical grid.

13. The circuit of claim 9, wherein each of the plurality of string members further comprises a power balancing circuit configured to balance the output provided by an energy output device with the individual AC energy output that is to be delivered to the electrical grid.

14. A circuit for an energy collection system comprising:
a string to couple to an electrical load, wherein the string comprises:
a plurality of string members coupled to each other in series; wherein each string member of the string comprises (i) a connection to receive an output from an energy output device, (ii) an inverter configured to convert the output of the energy output device into an individual alternating current (AC) energy output, (iii) a control circuit configured to control one or more operations of the respective string member, and (iv) a voltage compensator operating in a voltage control mode,
a controller coupled to the string,
wherein each of the plurality of voltage compensators comprises a voltage compensating circuit configured to control an amount of voltage the respective VC is to output based on at least one of an input voltage and an input power of the respective string member,
wherein each string member is assigned a relative scale of strength (SoS) ranking based on at least one of input voltage and input power of each string member,
wherein based on the SoS rank a string member is assigned a task of filling a gap in voltage of the string in relation to the electrical grid, and
wherein the controller communicates with each of the plurality of voltage compensators to ensure that the respective voltage compensating circuits results in synchronized voltage regulation among the multiple voltage compensators.

15. The circuit of claim 14, wherein the electrical load further comprises a grid interface to couple the energy collection system to an electrical grid.

16. The circuit of claim 15, wherein a communications gateway is coupled to the string and to the electrical grid, the communications gateway being configured to broadcast a synchronization signal to each string member of the plurality of string members to enable each string member of the plurality of string members to operate using at least one of:
a phase that is synchronous with a phase of the electrical grid, or a frequency that is synchronous with a frequency of the electrical grid.

17. The circuit of claim 15, further comprising:
a controller coupled to one or more grid disconnect switches, wherein the one or more grid disconnect switches are controlled by the controller and wherein the controller is configured to cause the one or more grid disconnect switches to change states during faulty conditions.

18. The circuit of claim 15, wherein the individual AC energy output that is converted by the inverter of each of the plurality of string members has at least one of (i) an AC voltage output whose magnitude is based on at least one of a voltage or current magnitude or a power or energy sourcing and sinking capability of an input energy source or storage of the respective string member, (ii) a phase output that is based on a phase of the electrical grid, or (iii) a frequency output that is based on a frequency of the electrical grid.

19. The circuit of claim 15, wherein each of the plurality of string members further comprises a power balancing circuit configured to balance the output provided by an energy output device with the individual AC energy output that is to be delivered to the electrical grid.

20. A circuit for an energy collection system comprising:
a string to couple to an electrical load, wherein the string comprises:
a plurality of string members coupled to each other in series; wherein each string member of the string comprises (i) a connection to receive an output from an energy output device, (ii) an inverter configured to convert the output of the energy output device into an individual alternating current (AC) energy output, (iii) a control circuit configured to control one or more operations of the respective string member,
a controller coupled to the string,
wherein one of the string members further comprises a voltage compensator (VC) and each of other ones of the string members further comprises a current administrator voltage compensator (CAVC),
wherein VC functionality is assigned based on a relative scale of strength (SoS) ranking of the plurality of string members based on at least one of input voltage and input power of each string member,
wherein each CAVC controls and regulates the string current,
wherein the VC further comprises a voltage compensating circuit configured to control an amount of voltage the VC is to output commensurate with the input power of the respective string member,
wherein each CAVC further comprises a current equalizing circuit configured to handle mismatch of current between adjacent current administrator voltage compensators,
wherein the VC compensates voltage to be adequately and sufficiently compatible with that of the load,
wherein each CAVC synthesizes current and compensates string voltage to be adequately and sufficiently compatible with that of the load requirements by producing its individual AC power output based on its respective maximum power point (MPP) of the CAVC, and
wherein the controller communicates with the VC, via a control circuit of the string member that comprises the VC, to ensure that the voltage controlled by the voltage compensating circuit of the VC results in synchronized voltage regulation among the string members of the string and that each current controlled by a respective CAVC results in synchronized current generation among the string members of the string.

21. The circuit of claim 20, wherein the electrical load further comprises a grid interface to couple the energy collection system to an electrical grid.

22. The circuit of claim 21, wherein a communications gateway is coupled to the string and to the electrical grid, the communications gateway being configured to broadcast a synchronization signal to each string member of the plurality of string members to enable each string member of the plurality of string members to operate using at least one of:
a phase that is synchronous with a phase of the electrical grid, or
a frequency that is synchronous with a frequency of the electrical grid.

23. The circuit of claim 21, further comprising:
a controller coupled to one or more grid disconnect switches, wherein the one or more grid disconnect switches are controlled by the controller and wherein the controller is configured to cause the one or more grid disconnect switches to change states during faulty conditions.

24. The circuit of claim 21, wherein the individual AC energy output that is converted by the inverter of each of the plurality of string members has at least one of (i) an AC voltage output whose magnitude is based on at least one of a voltage or current magnitude or a power or energy sourcing and sinking capability of an input energy source or storage of the respective string member, (ii) a phase output that is based on a phase of the electrical grid, or (iii) a frequency output that is based on a frequency of the electrical grid.

25. The circuit of claim 21, wherein each of the plurality of string members further comprises a power balancing circuit configured to balance the output provided by an energy output device with the individual AC energy output that is to be delivered to the electrical grid.

* * * * *